(12) United States Patent
Fujita et al.

(10) Patent No.: US 8,415,945 B2
(45) Date of Patent: Apr. 9, 2013

(54) SHEET COIL TYPE RESOLVER

(75) Inventors: Kazuhiko Fujita, Nagano (JP); Takado Fukuda, Nagano (JP); Takaaki Ochiai, Nagano (JP)

(73) Assignee: Minebea Co., Ltd., Kitasaku-gun (JP)

( * ) Notice: Subject to any disclaimer, the term of this patent is extended or adjusted under 35 U.S.C. 154(b) by 259 days.

(21) Appl. No.: 12/850,839

(22) Filed: Aug. 5, 2010

(65) Prior Publication Data

US 2011/0043196 A1 Feb. 24, 2011

(30) Foreign Application Priority Data

Aug. 20, 2009 (JP) ................. 2009-190928

(51) Int. Cl.
*G01B 7/14* (2006.01)
(52) U.S. Cl. .............. 324/207.16; 324/200; 324/207.23; 324/207.25
(58) Field of Classification Search .......... None
See application file for complete search history.

(56) References Cited

U.S. PATENT DOCUMENTS 5,239,288 A  8/1993 Tsals
2010/0117631 A1 * 5/2010 Inoue et al. .............. 324/207.24

FOREIGN PATENT DOCUMENTS

JP  04-222447 A  8/1992
JP  08-136211  5/1996

* cited by examiner

*Primary Examiner* — Melissa Koval
*Assistant Examiner* — Trung Nguyen
(74) *Attorney, Agent, or Firm* — Foley & Lardner LLP

(57) ABSTRACT

A sheet coil type resolver includes: a stator section in which a stator transformer coil composed of first and second stator transformer coil layers is disposed to axially overlap with a resolver stator coil composed of first and second resolver stator coil layers; and a rotor section in which a rotor transformer coil composed of first and second rotor transformer coil layers is disposed to axially overlap with a resolver rotor coil composed of first and second resolver rotor coil layers, whereby the axial dimension is reduced, lead wires can be easily led out from the coils, and high reliability is achieved.

6 Claims, 19 Drawing Sheets

First layer
Cross section taken along A - A in FIG.4

Second layer
Cross section taken along B - B in FIG.4

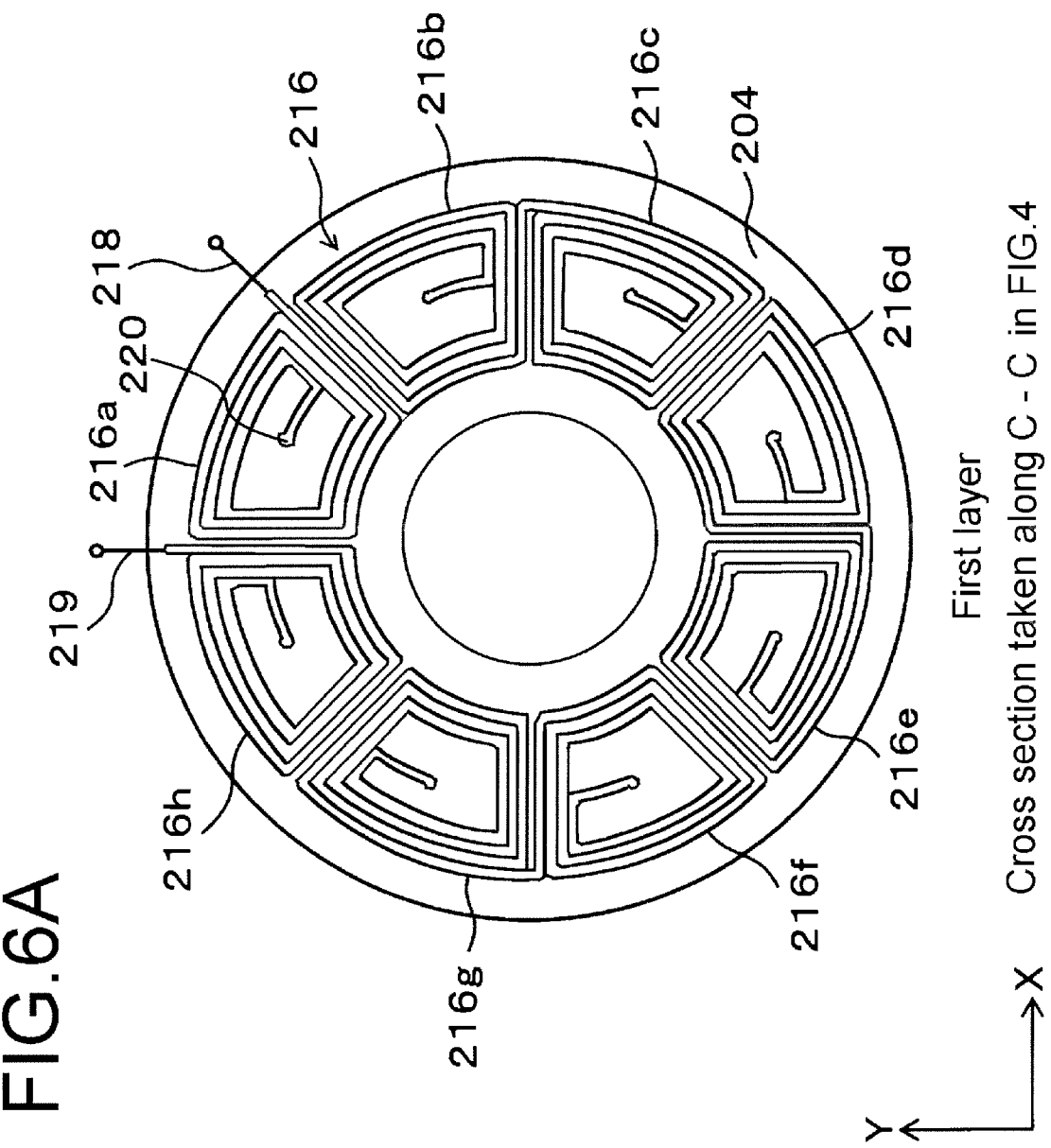

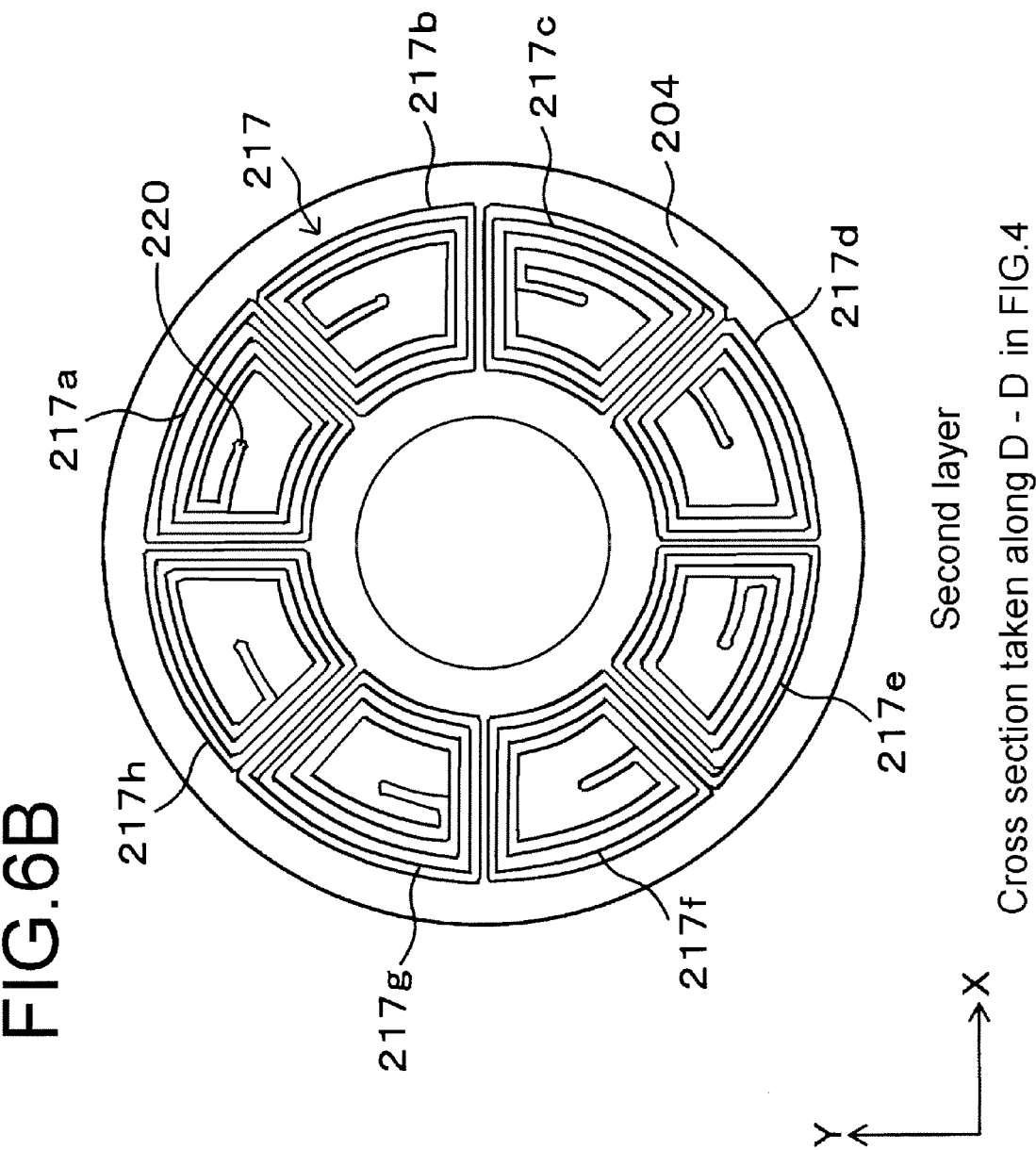

First layer
Cross section taken along A - A in FIG.7

Second layer

Cross section taken along B - B in FIG.7

First layer
Cross section taken along C - C in FIG.7

Single-phase input and two-phase output structure

Two-phase input and single-phase output structure

SHEET COIL TYPE RESOLVER

CROSS REFERENCE TO RELATED APPLICATIONS

This application is based upon and claims the benefit of priority from prior Japanese Patent Application No. 2009-190928, filed on Aug. 20, 2009;

the entire contents of which are incorporated herein by reference.

BACKGROUND OF THE INVENTION

1. Field of the Invention

The present invention relates to a sheet coil type resolver which uses a sheet coil as its electric conductor.

2. Description of the Related Art

A conventional sheet coil type resolver is disclosed and includes: an excitation coil of a single phase which is formed of a flat sheet coil such that the angle of each pole of pole-pair number X is 180 degrees in electrical angle; and a detection coil of two phases (phases A and B) which is formed of a flat sheet coil and disposed to axially oppose the excitation coil with a gap distance therebetween wherein phases A and B have a phase difference of 90 degrees in electrical angle from each other (refer to Japanese Patent Application Laid-Open No. H8-136211).

FIG. 14 shows schematically a radial cross section of a rotor coil system at a rotor section of a conventional sheet coil type resolver. In the rotor coil system at the rotor section, a resolver coil 1005 as an excitation coil is disposed at a radially outer side of a circular disk shaped insulation sheet 1004, and a transformer coil (secondary winding) 1006 to supply an excitation current to the resolver coil (excitation coil) 1005 is disposed at a radially inner side of the insulation sheet 1004 so as to be located radially inward of the resolver coil (excitation coil) 1005 thus located close to a rotary shaft. The aforementioned two coils 1005 and 1006 are disposed to face a circular disk-shaped rotor core.

On the other hand, a stator coil system of a stator section of the sheet coil type resolver, though not shown, includes a resolver coil (as a detection coil) having a two-layer structure composed of A- and B-phase detection coils and a transformer coil (primary coil) and is arranged in the same way as the rotor coil system, specifically such that the transformer coil (primary coil) is disposed radially inward of the resolver coil (detection coil).

A transformer coil system is constituted such that the transformer coil (secondary winding) at the rotor section and the transformer coil (primary winding) at the stator section are disposed to axially oppose each other. Also, a resolver coil system is constituted such that the excitation coil at the rotor section and the detection coil composed of the A- and B-phase detection coils at the stator section are disposed to axially oppose each other.

The sheet coil type resolver disclosed in Japanese Patent Application Laid-Open No. H8-136211, however, has the following defects. The transformer coil (secondary winding) of the rotor section is disposed radially inward of the excitation coil and located close to the rotary shaft, and the transformer coil (primary winding) of the stator section is disposed radially inward of the detection coil and located close to the rotary shaft. Thus, in the above described coil arrangement at each of the rotor section and the stator section, two kinds of coils are disposed concentrically to each other on one plane with one coil located radially outward of the other coil located close to the rotary shaft, and therefore both the rotor section and the stator section are forced to have an enlarged diameter thus making downsizing difficult. Also, the rotor core and the stator core are inevitably forced to have an enlarged diameter, too, and therefore apt to suffer distortion in shape.

Further, since the distance is large between the rotary shaft and the outer circumference of the resolver, the centrifugal force is easily generated and accordingly the area between the rotary shaft and the rotor core is susceptible to stress concentration. Consequently, it is possible that the rotor section and the rotary shaft are shifted from each other and also that the joint area therebetween is fractured.

Moreover, terminals of the transformer coil disposed radially inwardly need to be led out outside at the stator section, and in order to secure the space for leading out the terminals, the space which is allocated for the resolver coil disposed radially outwardly must be diminished or an additional layer for a wiring of the lead wires must be provided.

SUMMARY OF THE INVENTION

The present invention has bee made in light of the problems described above, and it is an object of the present invention to provide a sheet coil type resolver in which the diameter can be reduced and at the same time wirings from sheet coils can be easily done, and which has a high reliability.

In order to achieve the object described above, according to an aspect of the present invention, there is provided a sheet coil type resolver in which a stator section includes a resolver stator coil and a stator transformer coil each thereof comprising at least one coil layer each including one or more stator coil patterns which have a planar shape and which are disposed circumferentially on a same plane, and in which a rotor section includes a resolver rotor coil and a rotor transformer coil each thereof including at leas one coil layer each including one or more rotor coil patterns which have a planar shape and which are disposed circumferentially on a same plane. In the sheet coil type resolver described above, the rotor section is disposed to axially oppose the stator section with an air gap therebetween, wherein the resolver stator coil and the stator transformer coil are disposed to axially overlap with each and the resolver rotor coil and the rotor transformer coil are disposed to axially overlap with each other.

According to the sheet coil type described above, the resolver stator coil and the stator transformer coil are disposed on respective different planes so as to be arranged in the axial direction in the stator section, and the resolver rotor coil and the rotor transformer coil are disposed on respective different planes so as to be arranged in the axial direction in the rotor section, whereby the resolver coil system (excitation coil and detection coil) and the transformer coil systems are arranged to axially overlap at least partly with each other.

In the aspect of the present invention, the outside dimensions of the resolver stator coil, the stator transformer coil, the resolver rotor coil and the rotor transformer coil may be individually determined according to pattern areas configured by respective coil pattern layouts.

In the aspect of the present invention, the stator section may further include a stator core disposed at one axial end of the sheet coil type resolver and may be structured such that the stator core, the stator transformer coil and the resolver stator coil are arranged axially in this order toward the rotor section, and the rotor section may further include a rotor core disposed at the other axial end of the sheet coil type resolver and may be structured such that the rotor core, the rotor transformer coil and the resolver rotor coil are arranged axially in this order toward the stator section.

In the aspect of the present invention, the stator section may be structured such that the stator core, the resolver stator coil and the stator transformer coil are arranged axially in this order toward the rotor section, and the rotor section may be structured such that the rotor core, the rotor transformer coil and the resolver rotor coil are arranged axially in this order toward the stator section.

In the aspect of the present invention, the stator section may be structured such that the stator core, the stator transformer coil and the resolver stator coil are arranged axially in this order toward the rotor section, and the rotor section may be structured such that the rotor core, the resolver rotor coil and the rotor transformer coil are arranged axially in this order toward the stator section.

In the aspect of the present invention, the stator section may be structured such that the stator core, the resolver stator coil and the stator transformer coil are arranged axially in this order toward the rotor section, and the rotor section may be structured such that the rotor core, the resolver rotor coil and the rotor transformer coil are arranged axially in this order toward the stator section.

According to the present invention, since respective coils are disposed on different planes so as to axially overlap with each other in a sheet coil, the radial dimension can be reduced, and thus the sheet coil type resolver can be downsized. Also, since no other sheet coil is provided around one sheet coil, lead wires can be easily led out from the sheet coil. Further, since the length of such lead wires is reduced, the wires suffer less problems, such as wire breakage, and high reliability can be achieved.

BRIEF DESCRIPTION OF THE DRAWINGS

FIG. 6A is a radial cross sectional view of a first coil layer (first resolver rotor coil layer) of the two-layer structured resolver rotor coil taken along C-C in FIG. 4, and FIG. 6B is a radial cross sectional view of a second coil layer (second resolver rotor coil layer) of the two-layer structured resolver rotor coil taken along D-D in FIG. 4;

DETAILED DESCRIPTION OF THE INVENTION

Exemplary embodiments of the present invention will hereinafter be described with reference to the companying drawings.

Figure 1:
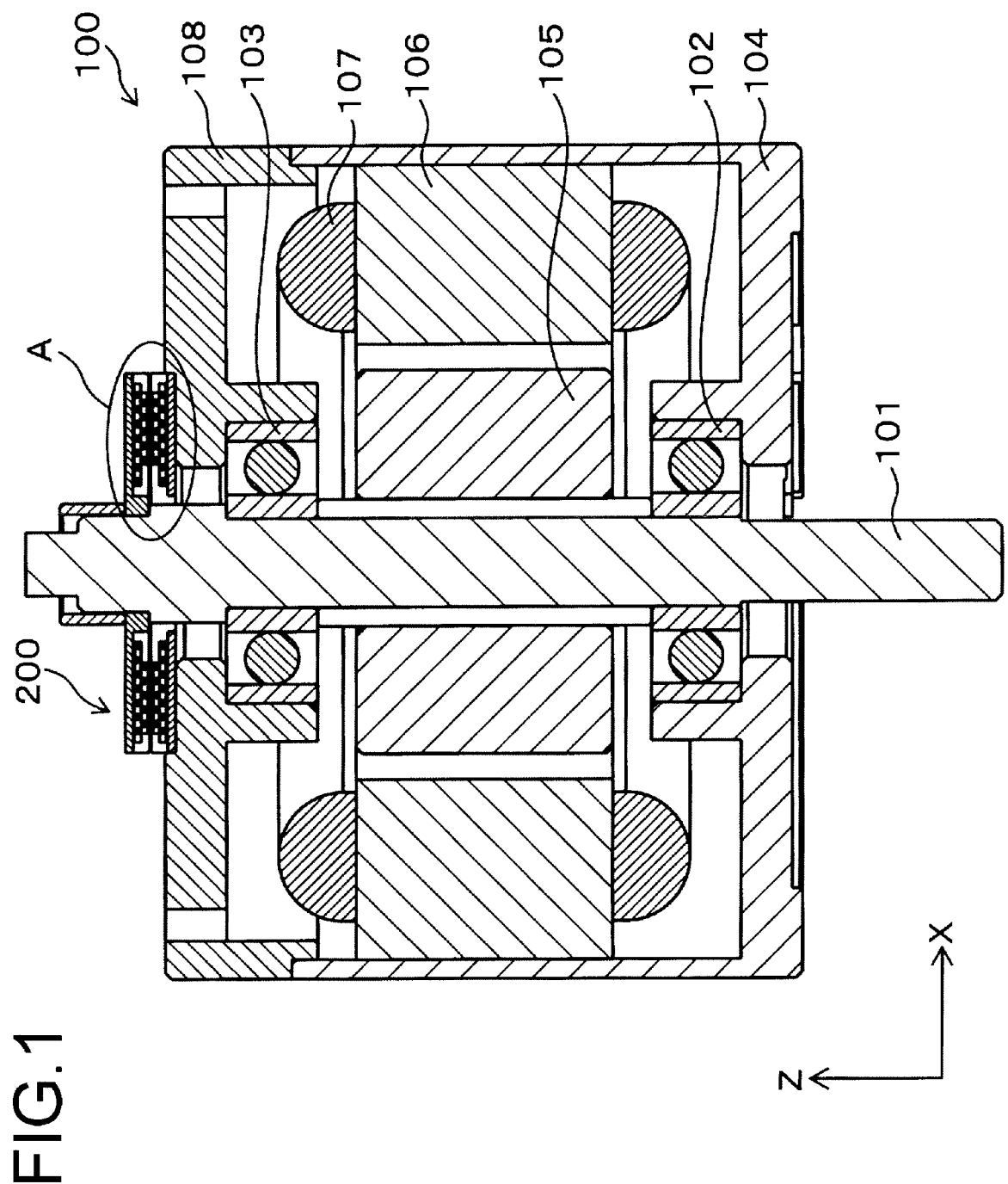
FIG. 1 is an axial cross sectional view of an AC servo motor assembled with a sheet coil type resolver according to a first embodiment of the present invention.

First, description will be made of a motor to which a sheet coil type resolver of the present invention is attached. FIG. 1 shows an axial cross section of a motor 100 to which any one of sheet coil type resolvers according to the present invention is attached. Referring to FIG. 1, the motor 100 is an AC servo motor and includes a rotary shaft 101. The rotary shaft 101 is rotatably supported by bearings 102 and 103. The bearing 102 is attached to a motor housing 104 and the bearing 103 is attached to a rear end cap 108 fixed to the rear end (upper side in the figure) of the motor housing 104. Thus, the rotary shaft 101 is supported rotatably with respect to the motor housing 104. A motor rotor 105 constituted by a permanent magnet having a plurality of magnetic poles is attached to the rotary shaft 101.

A motor stator core 106 is disposed to radially oppose the motor rotor 105. The motor stator core 106 is made of a magnetic material, such as silicon steel, and fixed to the motor housing 104. The motor stator core 106 includes a plurality of salient poles (not illustrated) which correspond in number to the magnetic poles of the motor rotor 105, wherein the salient poles circumferentially surround the motor rotor 105. The structure described above is common to general AC servo motors and detailed description thereof will be omitted.

Motor windings 107 are wound on the motor stator core 106. Terminals (not shown) of each of the motor windings 107 are led out outside the motor housing 104 and connected to a motor drive circuit (not shown). At the rear end (upper side in the figure) of the motor 100 described above, a sheet coil type resolver 200 according to a first embodiment of the present invention is attached in a unified manner, whereby the rotation angle of the rotary shaft 101 can be electrically detected.

Figure 2:
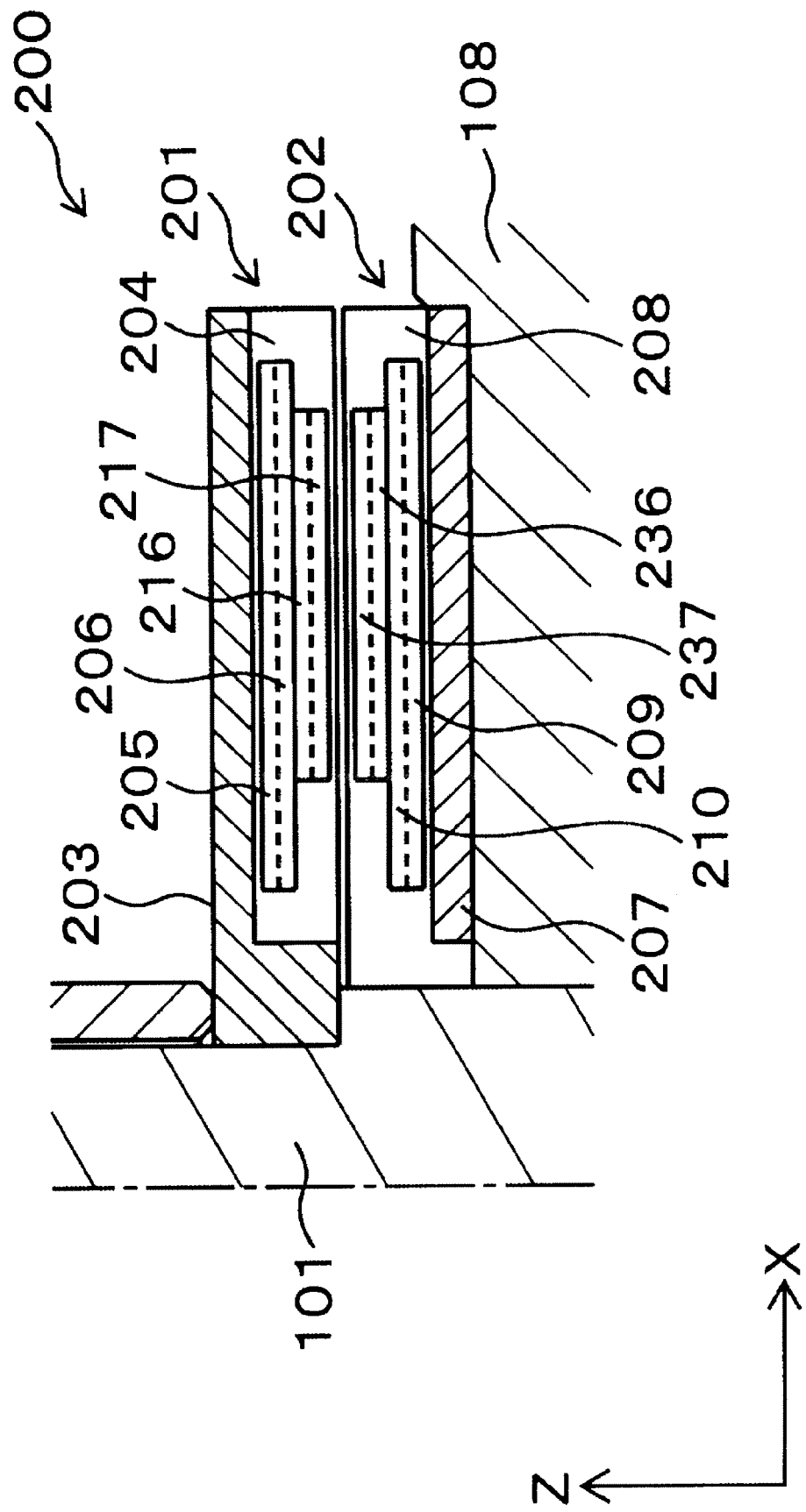
FIG. 2 is a partial (a portion indicated by A in FIG. 1) cross sectional view of the sheet coil type resolver shown in FIG. 1.
Figure 3:
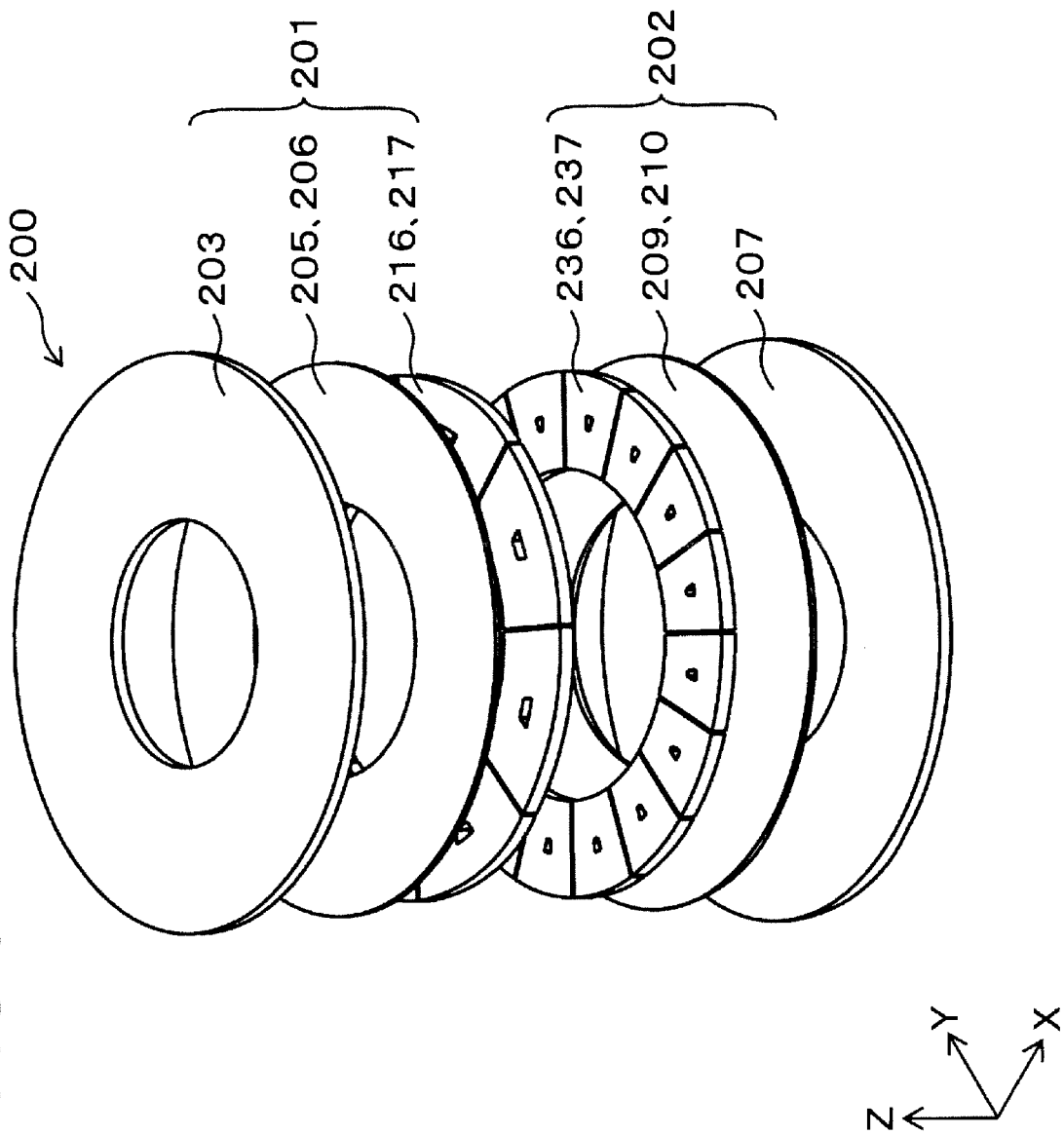
FIG. 3 is an exploded perspective view of a relevant portion of the sheet coil type resolver shown.

Now, description will be made of the general composition of the aforementioned sheet coil type resolver 200 according to the first embodiment. FIG. 2 shows an enlarged cross section of a part (indicated by A in FIG. 1) of the sheet coil type resolver 200, and FIG. 3 shows disassembled constituent members of a relevant portion of the sheet coil type resolver 200. Referring to FIGS. 2 and 3, the sheet coil type resolver 200 includes a rotor section 201 and a stator section 202. The rotor section 201 includes a rotor core 203 made of a magnetic material, such as silicon steel formed into a circular disk shape. An insulation sheet 204 made of a resin material is fixedly attached to a side surface of the rotor core 203 facing the stator section 202 (the insulation sheet 204 is omitted in FIG. 3). As will be described later, the sheet coil type resolver 200 has an axial multiple angle nX where n=4.

Figure 4:
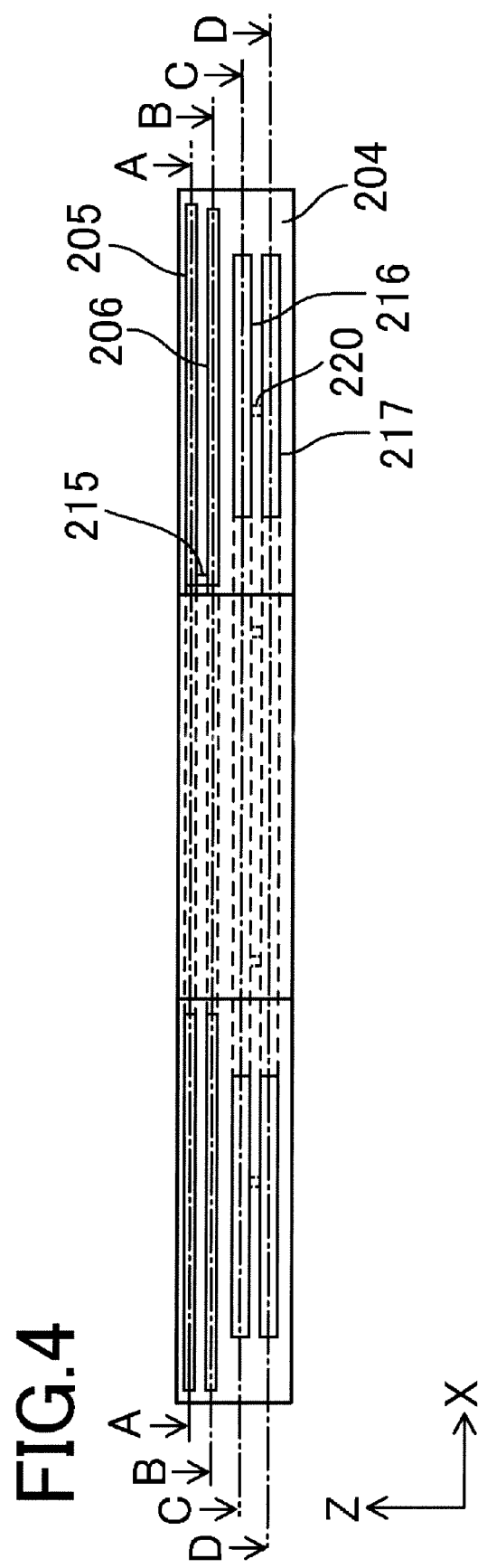
FIG. 4 is a schematic axial cross sectional view of a rotor section of the sheet coil type resolver, explanatorily illustrating a rotor coil system which includes a two-layer structured rotor transformer coil and a two-layer structured resolver rotor coil functioning as a excitation coil.

Description will be made of the rotor section 201. FIG. 4 schematically shows an axial cross section of a rotor coil system disposed at the rotor section 201.

Referring to FIG. 4 and also FIG. 2, the rotor coil system is embedded in the insulation sheet 204 and includes a two-layer structured rotor transformer coil which is composed of a first coil layer (hereinafter referred to as "first rotor transformer coil layer") 205 and a second coil layer (hereinafter referred to as "second rotor transformer coil layer") 206 and a two-layer structured resolver rotor coil which functions as an excitation coil and which is composed of a first coil layer (hereinafter referred to as "first resolver rotor coil layer") 216 and a second coil layer (hereinafter referred to as "second resolver rotor coil layer") 217, wherein the first rotor transformer coil layer 205, the second rotor transformer coil layer 206, the first resolver rotor coil layer 216 and the second resolver rotor coil layer 217 are arranged axially in this order from the rotor core 203 toward the stator section 202. In this connection, in FIG. 3, the first and second rotor transformer coil layers 205 and 206 are shown together conceptually as one piece member, and the first and second resolver rotor coil layers 216 and 217 are shown together conceptually as one piece member.

Figure 5A:
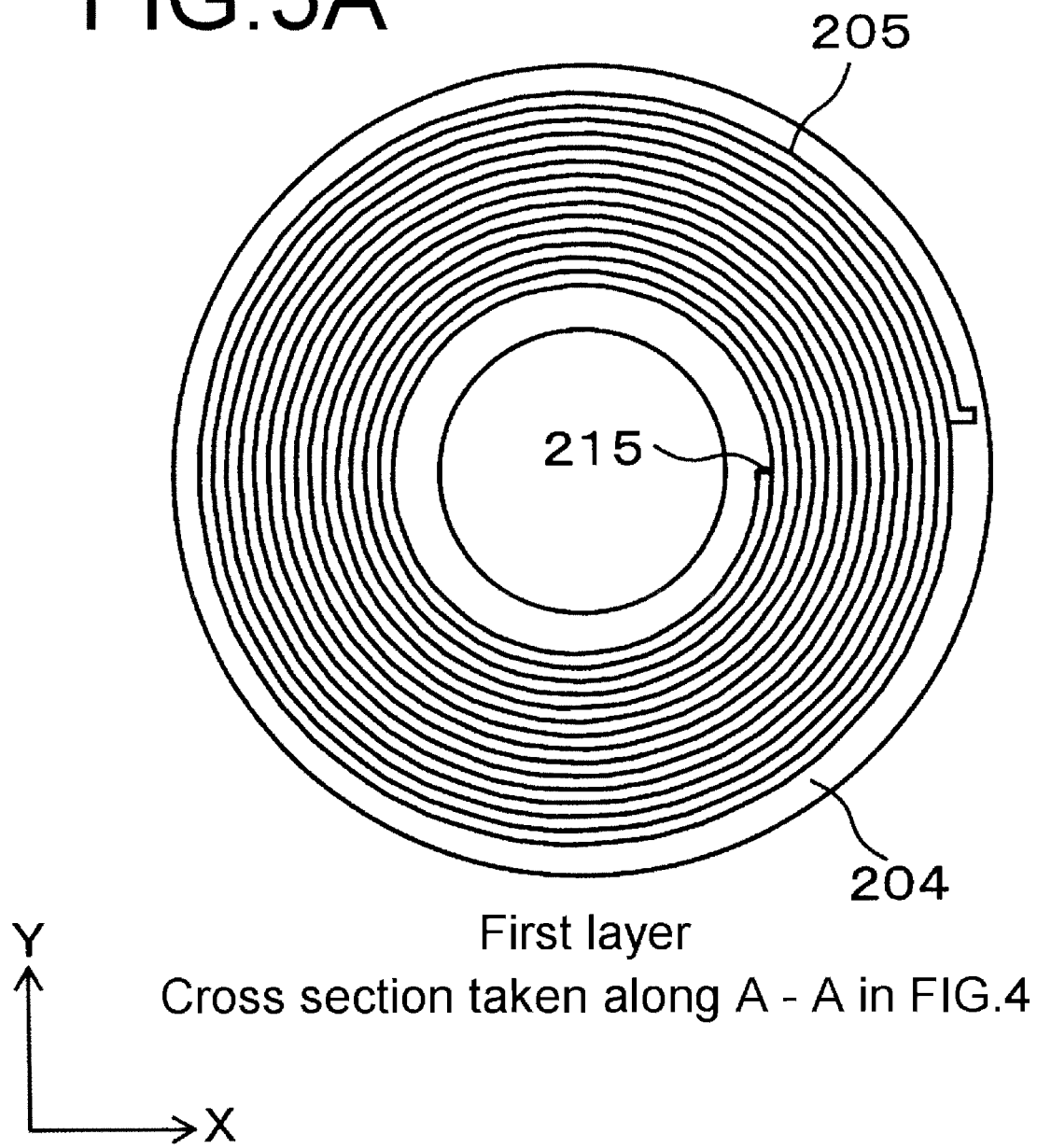
FIG. 5A is a radial cross sectional view of a first coil layer (first rotor transformer coil layer) of the two-layer structured rotor transformer coil taken along A-A in FIG. 4.
Figure 5B:
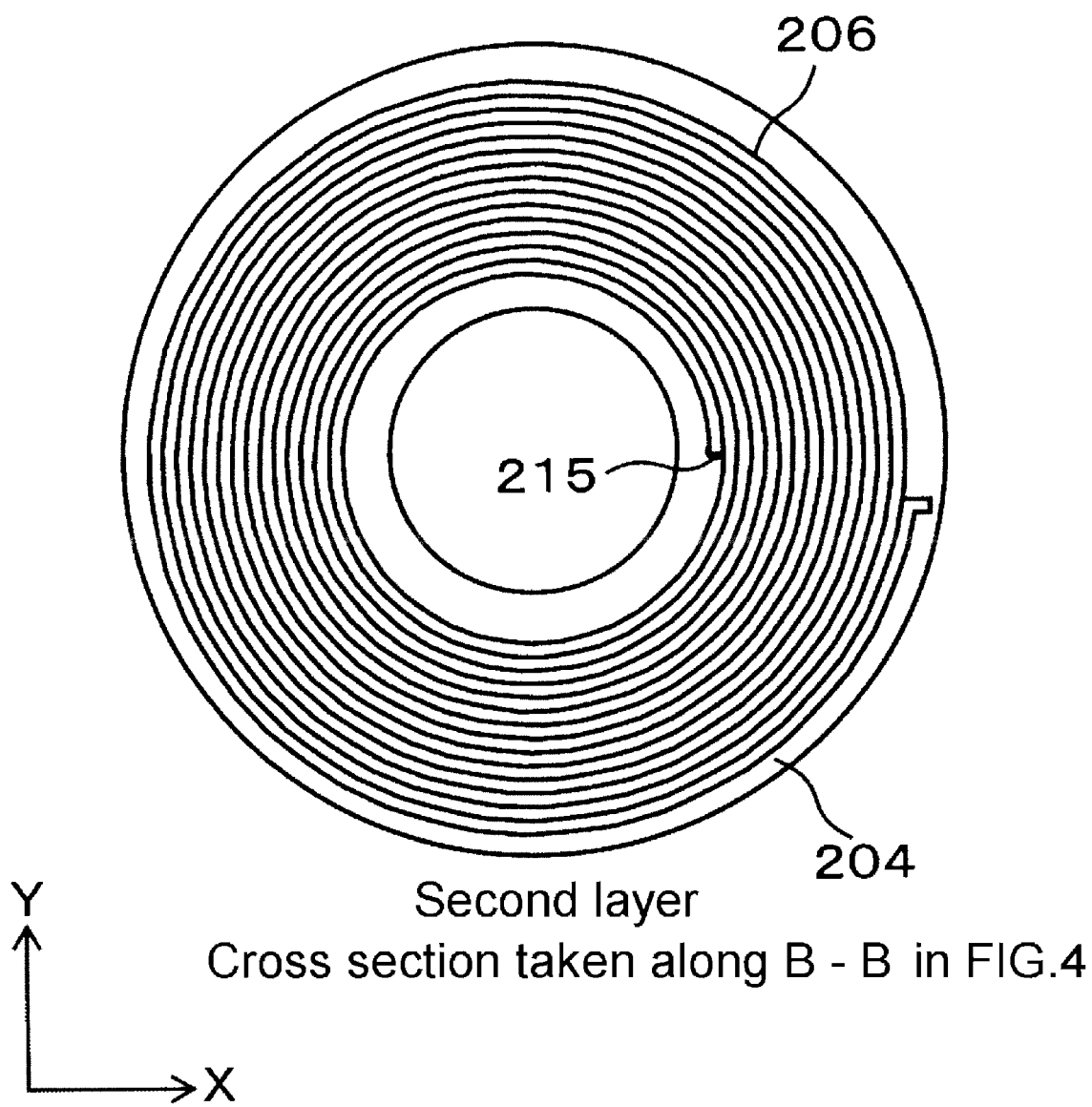
FIG. 5B is a radial cross sectional view of a second coil layer (second rotor transformer coil layer) of the two-layer structured rotor transformer coil taken along B-B in FIG. 4.

FIGS. 5A and 5B show radial cross sections of patterns of the first and second rotor transformer coil layers 205 and 206 of the two-layer structured rotor transformer coil at the rotor section 201 taken along A-A and B-B in FIG. 4, respectively, viewed from the positive direction of Z-axis. The first rotor transformer coil layer 205 which has a circular spiral coil pattern (rotor transformer coil pattern) of FIG. 5A and the second rotor transformer coil layer 206 which has a circular spiral coil pattern (rotor transformer coil pattern) of FIG. 5B are connected in series to each other via a conductor located in a hole 215. Lead wires (not shown) from the first and second rotor transformer coil layers 205 and 206 are connected to the first and second resolver rotor coil layers 216 and 217.

FIGS. 6A and 6B show radial cross sections of patterns of the first and second resolver rotor coil layers 216 and 217 of the two-layer structured resolver rotor coil at the rotor section 201 taken along C-C and D-D in FIG. 4, respectively, viewed from the positive direction of Z-axis.

Referring to FIGS. 6A and 6B, eight substantially rectangular spiral coil patterns are formed circumferentially at each of the first and second resolver rotor coil layers 216 and 217. Specifically, the first resolver rotor coil layer 216 includes resolver rotor coil patterns 216a to 216h as shown in FIG. 6A, and the second resolver rotor coil layer 217 includes resolver rotor coil patterns 217a to 217h as shown in FIG. 6B.

The resolver rotor coil patterns 216a to 216h of the first resolver rotor coil layer 216 are disposed on the same plane and arranged such that two adjacent coil patterns are circumferentially shifted from each other by a mechanical angle of 45 degrees (360 degrees/8). This arrangement applies in the same manner to the resolver rotor coil patterns 217a to 217h of the second resolver rotor coil layer 217. The resolver rotor coil patterns 216a to 216h are each structured such that a conductor is spirally wound clockwise starting from the outer circumference toward the spiral center when viewed from the upper side in FIG. 2, and the resolver rotor coil patterns 217a to 217h are each structured such that a conductor is spirally wound counterclockwise starting from the outer circumference toward the spiral center when viewed from the upper side in FIG. 2.

The first ad second resolver rotor coil layers 216 and 217 are mutually related to each other and constitute in combination a part of the rotor coil system at the rotor section 201 of the sheet coil type resolver 200. In the present embodiment, a lead wire 218 is led out from the resolver rotor coil pattern 216a, a lead wire 219 is led out from the resolver coil pattern 216h, and the two lead wires 218 and 219 are connected to the first and second rotor transformer coil layers 205 and 206 shown in FIGS. 5A and 5B.

The connection structure of the two-layer structured resolver rotor coil will be described in line with the flow of excitation current. The excitation current is an alternating current, but for the purpose of convenience the explanation will be made according to the excitation current flow starting from the lead wire 218.

The excitation current applied to the lead wire 218 is caused to flow spirally through the resolver rotor coil pattern 216a of the first resolver rotor coil layer 216 in the clockwise direction starting from the outer circumference to the center of the coil, pattern pass through a conductor located in a hole 220, and arrives at the resolver rotor coil pattern 217a of the second resolver rotor coil layer 217. The current then flows spirally through the resolver coil pattern 217a in the clockwise direction starting from the center of the coil pattern to the outer circumference. According to the current flow described above, the magnetic flux produced by the resolver rotor coil pattern 216a of the first resolver rotor coil layer 216 has the same direction as the magnetic flux produced by the resolver rotor coil pattern 217a of the second resolver rotor coil layer 217, whereby the magnetic flux is increased on the whole. That is to say, in terms of the coil phase, the resolver rotor coil pattern 216a and the resolver rotor coil pattern 217a, which are located to overlap with each other when viewed from the axial direction, are in the same phase (while opposite to each other in terms of spiral winding direction).

The current which has passed through the resolver rotor coil pattern 217a arrives at the resolver rotor coil pattern 217b and flows spirally therethrough in the counterclockwise direction starting from the outer circumference of the coil pattern to the center. Then, the current passes through a conductor located in a hole, arrives at the resolver rotor coil pattern 216b of the first resolver rotor coil layer 216 and flows spirally therethrough in the counterclockwise direction starting from the center of the coil pattern to the outer circumference.

As shown from the current flowing through the resolver rotor coil patterns 216a and 216b as described above, the currents flowing respectively through adjacent two of the resolver rotor coil patterns 216a to 216h are caused to flow in respective spiral directions opposite to each other, and the magnetic fluxes produced respectively by two adjacent resolver rotor coil patterns are directed opposite to each other. The same is applied to the current flow direction and the magnetic flux direction in the resolver rotor coil patterns 217a to 217h.

Thus, the excitation current applied to the lead wire 218 flows in the order of the resolver rotor coil patterns 216a, 217a, 217b, 216b, 216c, 217c, 217d, 216d, 216e, 217e, 217f, 216f, 216g, 217g, 217h and 216h and arrives at the lead wire 219. The excitation current is an alternating current and the current flow direction is inverted periodically, and when the current flow is reversed to the direction described above, the excitation current flows in the reverse order starting from the lead wire 219 to the lead wire 218.

In the structure described above, two adjacent resolver rotor coil patters of the first resolver rotor coil layer 216 are connected in series to each other via one of the resolver rotor coil patterns of the second resolver rotor coil layer 217. The same is applied to the connection of two adjacent resolver rotor coil patterns of the second resolver rotor coil layer 217.

In the structure of the rotor section 201 described above, when the rotary shaft 101 of the motor 100 rotates, the first and second rotor transformer coil layers 205 and 206 and the first and second resolver rotor coil layers 216 and 217 formed in the insulation sheet 204 are caused to rotate together with the rotor section 201 in conjunction with the rotation of the rotary shaft 101.

The stator section 202 will hereinafter be described. Referring back to FIGS. 2 and 3, the stator section 202 includes a stator core 207 made of silicon steel and having a circular disk shape. The stator core 207 is fixed to the rear end cap 108 (at the motor housing). An insulation sheet 208 is fixedly attached to a side of the rotor section 201 facing the rotor section 201. The insulation sheet 208 is a sheet-like insulation member made of the same material as the insulation sheet 204.

Figure 7:
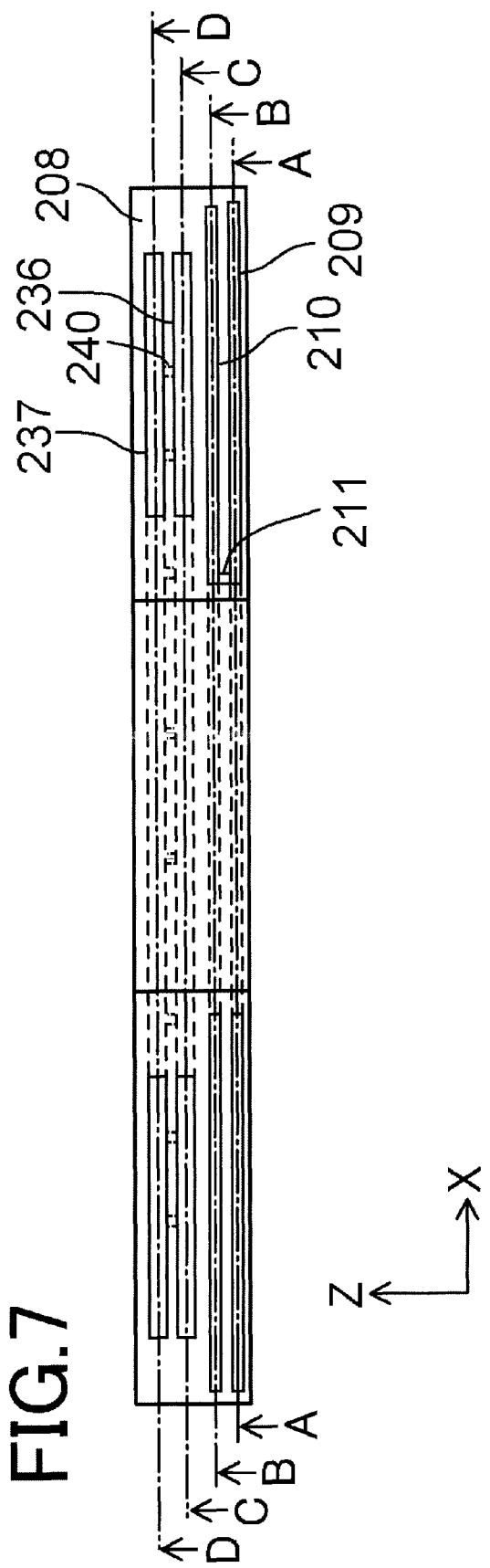
FIG. 7 is a schematic axial cross sectional view of a stator section of the sheet coil type resolver, explanatorily illustrating a stator coil system which includes a two-layer structured stator transformer coil and a two-layer structured resolver stator coil functioning as a detection coil.

FIG. 7 schematically shows an axial cross section of the stator section 202. Referring to FIG. 7 and also FIG. 2, the stator section 202 further includes a stator coil system. The stator coil is embedded in the insulation sheet 208 and includes a two-layer structured stator transformer coil which is composed of a first coil layer (hereinafter referred to as "first stator transformer coil layer") 209 and a second coil layer (hereinafter referred to as "second stator transformer coil layer") 210, and a two-layer resolver stator coil which functions as a detection coil and which is composed of a first coil layer (herein referred to as "first resolver stator coil layer") 236 and a second coil layer (hereinafter referred to as "second resolver stator coil layer") 237, wherein the first stator transformer coil layer 209, the second stator transformer coil layer 210, the first resolver stator coil layer 236 and the second resolver stator coil layer 237 are arranged axially in this order from the stator core 207 toward the rotor section 201. In FIG. 3, the insulation sheet 208 is omitted.

Figure 8A:
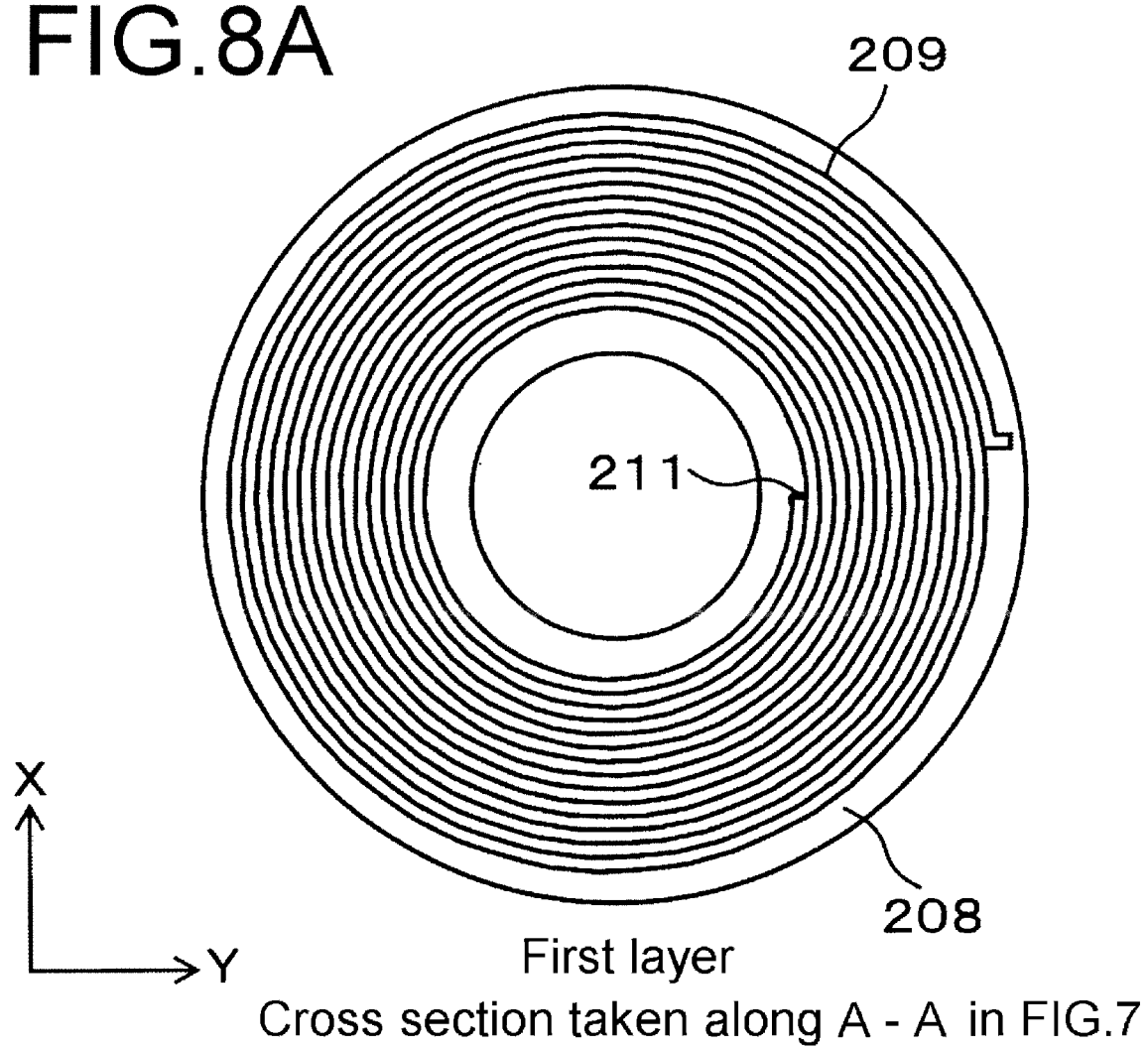
FIG. 8A is a radial cross sectional view of a first coil layer (first stator transformer coil layer) of the two-layer structured stator transformer coil taken along A-A in FIG. 7.
Figure 8B:
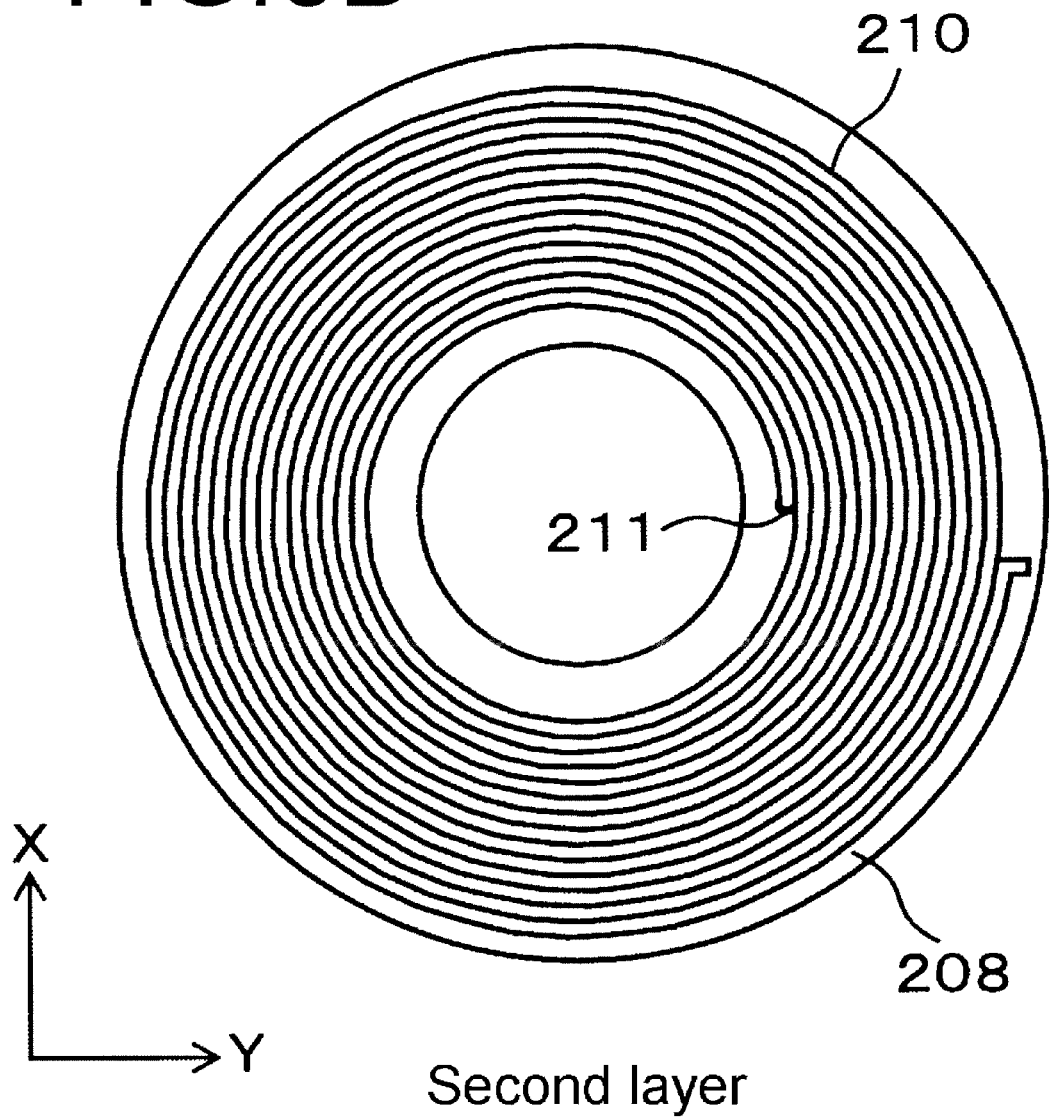
FIG. 8B is a radial cross sectional view of a second coil layer (stator transformer coil layer) of the two-layer structured stator transformer coil taken along B-B in FIG. 7.

FIGS. 8A and 8B show radial cross sections of patterns of the first and second stator transformer coil layers 209 and 210 of the two-layer structured stator transformer coil at the stator section 202 taken along A-A and B-B in FIG. 7, respectively, viewed from the negative direction of Z-axis.

Referring to FIGS. 7, 8A and 8B, the first stator transformer coil layer 209 which has a circular spiral coil pattern (stator transformer coil pattern) of FIG. 8A and the second stator transformer coil layer 210 which has a circular spiral coil pattern (stator transformer coil pattern) of FIG. 8B are connected in series to each other via a conductor located in a hole 211. Lead wires (not shown) from the first and second stator transformer coil layers 209 and 210 are connected to a circuit (not shown) to supply an excitation signal.

The first and second resolver stator coil layers 236 and 237 will be described with reference to FIGS. 9A and 9B which show radial cross sections of patterns of the first and second resolver stator coil layers 236 and 237 of the two-layer structured resolver stator coil at the stator section 202 taken along C-C and D-D in FIG. 7, respectively, viewed from the positive direction of Z-axis.

Figure 9A:
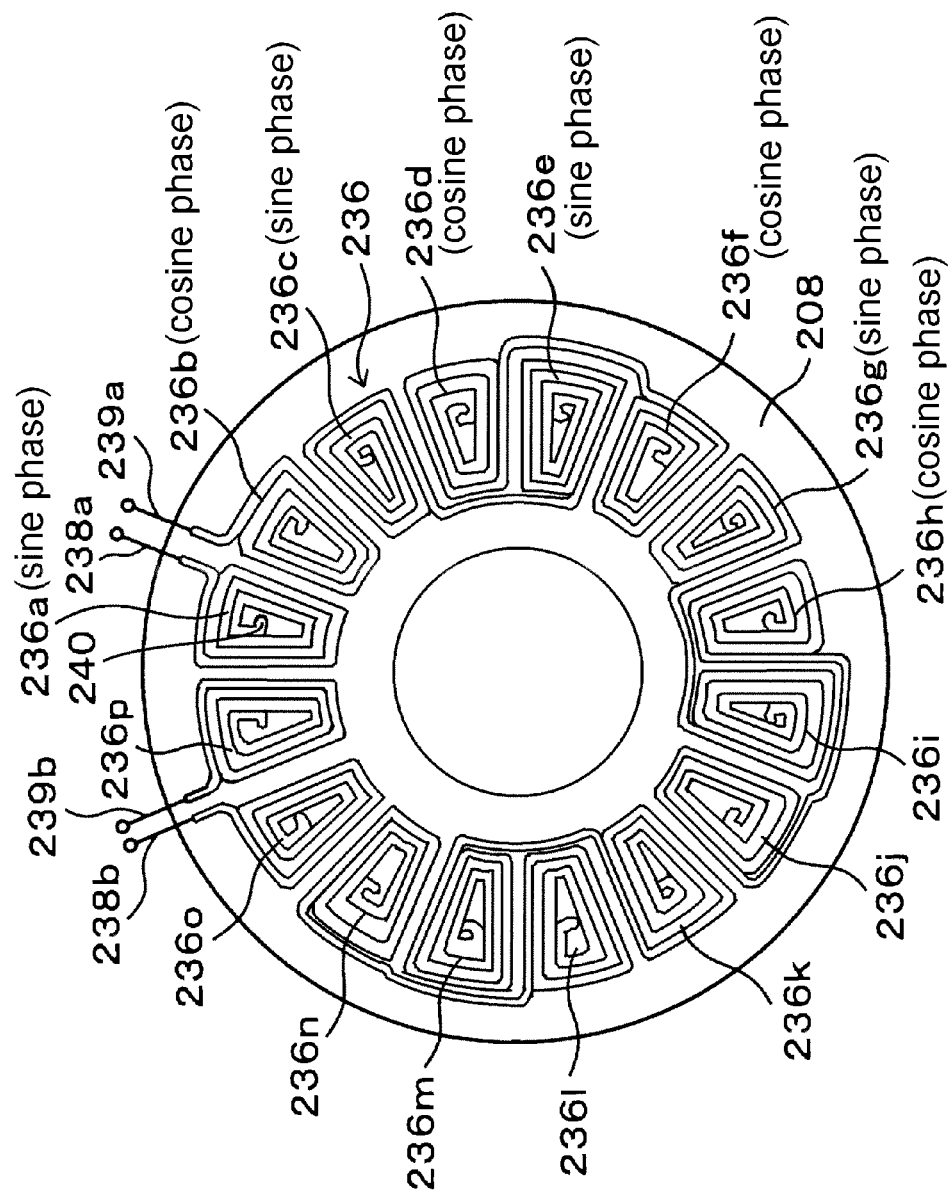
FIG. 9A is a radial cross sectional view of a first coil layer (resolver stator coil layer) of the two-layer structured resolver stator coil taken along C-C in FIG. 7.
Figure 9B:
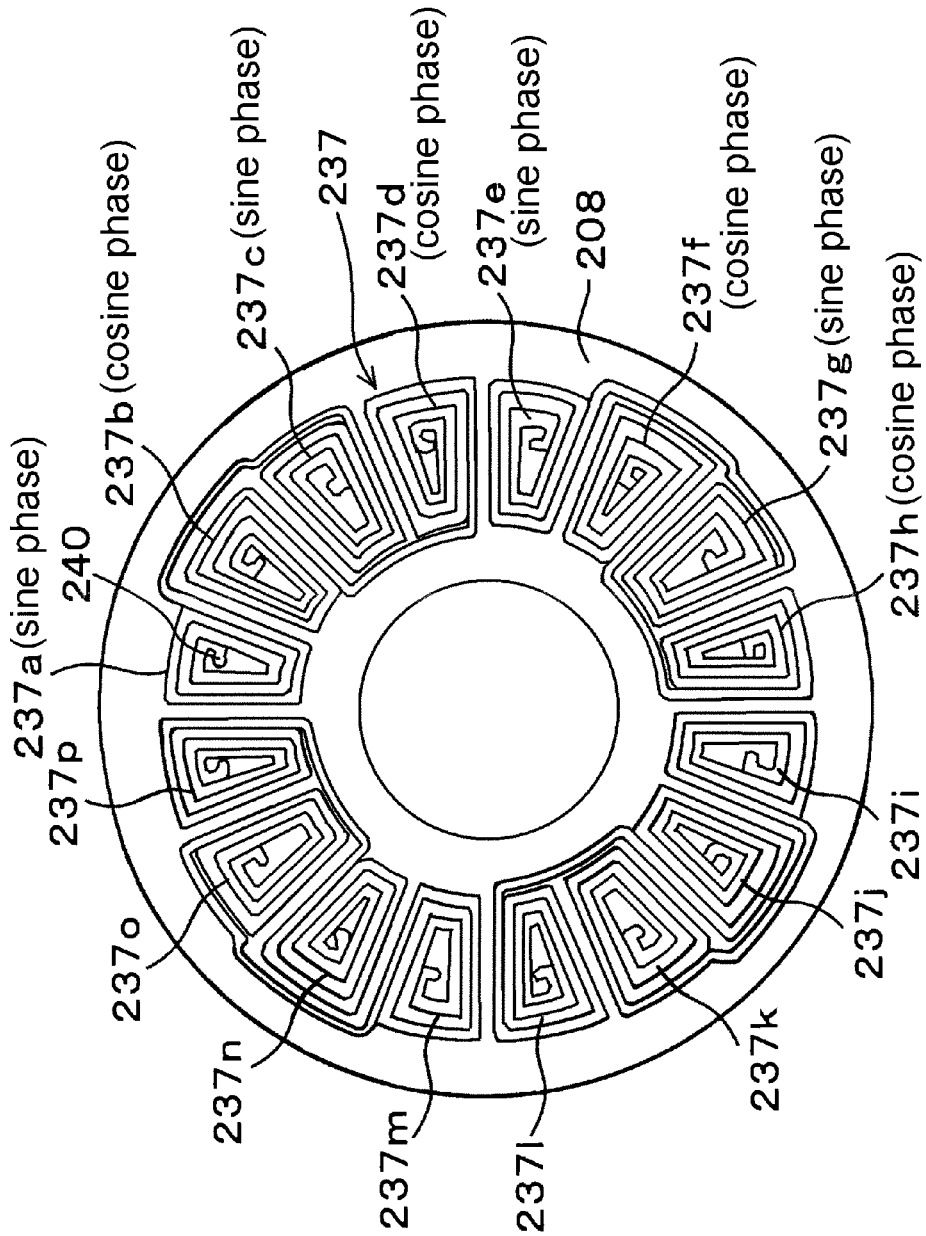
FIG. 9B is a radial cross sectional view of a second coil layer (second resolver stator coil layer) of the two-layer structured resolver stator coil taken along D-D in FIG. 7.

Referring to FIGS. 9A and 9B, sixteen rectangular (substantially square) spiral coil patterns are formed circumferentially at each of the first and second resolver stator coil layers 236 and 237. Specifically, the first resolver stator coil layer 236 includes resolver stator coil patterns 236a to 236p as shown in FIG. 9A, and the second resolver stator coil layer 237 includes resolver stator coil patterns 237a to 237p as shown in FIG. 9B. The resolver stator coil patterns 236a to 236p are formed on the same plane, which applies in the same manner to the resolver stator coil patterns 237a to 237p.

The resolver stator coil patterns 236a, 236c, 236e, 236g, 236i, 236k, 236m and 236o constitute a sine phase detection coil, and the resolver stator coil patterns 236b, 236d, 236f, 236h, 236j, 236l, 236n and 236p constitute a cosine phase detection coil. On the other hand, the resolver stator coil patterns 237a, 237c, 237e, 237g, 237i, 237k, 237m and 237o constitute a sine phase detection coil, and the resolver stator coil patterns 237b, 237d, 237f, 237h, 237j, 237l, 237n and 237p constitute a cosine phase detection coil.

The first and second resolver stator coil layers 236 and 237 are mutually related to each other and constitute in combination a part of the stator coil system at the stator section 202 of the coil sheet type resolver 200. In the present embodiment, sine phase lead wires 238a and 238b to output a sine phase output signal are led out from the resolver rotor stator patterns 236a and 236o, and cosine phase lead wires 239a and 239b to output a cosine phase output signal are led out from the resolver rotor coil patterns 236b and 236p. Though not illustrated, the sine phase lead wires 238a and 238b and the cosine phase lead wires 239a and 239b are led out from the sheet coil type resolver 200 and connected to an R/D converter (not shown) to calculate rotation angle.

The connection structure of the two-layer structured resolver stator coil will hereinafter be described. Description will first be made of the connection structure of a detection coil group for the sine phase. The lead wire 238a is connected to the spiral outermost portion of the resolver stator coil pattern 236a of the first resolver stator coil layer 236. The resolver stator coil pattern 236a is structured such that a conductor starts from the connection point with the lead wire 238a, is wound spirally in the counterclockwise direction so as to get closer to the spiral innermost portion and arrives at the spiral center of the coil pattern.

The conductor pattern having arrived at the spiral center of the resolver stator coil pattern 236a goes through a hole 240, and arrives at the spiral center of the resolver stator coil pattern 237a of the second resolver stator coil layer 237.

In the resolver stator coil pattern 237a, a conductor starts from the spiral center, is wound spirally in the counterclockwise so as to get closer to and arrive at the spiral outermost portion of the coil pattern, then extends circumferentially so as to go through a region located radially outward off the resolver stator coil pattern 237b disposed next to the resolver stator coil pattern 237a, and is connected to the radially outermost portion of the resolver stator coil pattern 237c in which a conductor starts from the connection point, is wound spirally in the clockwise direction so as to get closer to the spiral innermost portion, arrives at the spiral center, goes through a hole and is connected to the spiral center of the resolver stator coil pattern 236c of the first resolver stator coil layer 236.

In the resolver stator coil pattern 236c, a conductor starts from the connection point, is wound spirally in the clockwise direction so as to get closer to and arrive at the spiral outermost portion, then extends circumferentially so as to go through a region located radially inward off the resolver stator coil pattern 236*d* disposed next to the resolver stator coil 236*c*, and is connected to the resolver stator coil pattern 236*e*.

With repetition of the conductor pattern connections described above, the conductor stating from the sine phase lead wire 238*a* runs via the resolver stator coil patterns 236*a*, 237*a*, 237*c*, 236*c*, 236*e*, 237*e*, 237*g*, 236*g*, 236*i*, 237*i*, 237*k*, 236*k*, 236*m*, 237*m*, 237*o* and 236*o*, and finally arrives at the sine phase lead wire 238*b*. This resolver stator coil pattern arrangement constitutes a sine phase detection coil group to generate a sine phase output.

Conductor patterns for a detection coil group for the cosine phase are connected in the same manner as the detection coil group for the sine phase as described above, specifically the conductor stating from the cosine phase lead wire 239*a* runs via the resolver stator coil patterns 236*b*, 237*d*, 237*d*, 236*d*, 236*f*, 237*f*, 237*h*, 236*h*, 236*j*, 237*j*, 237*l*, 236*l*, 236*n*, 237*n*, 237*p* and 236*p* and finally arrives at the cosine phase lead wire 239*b*. This resolver stator coil pattern arrangement constitutes a cosine phase detection coil group to generate a cosine phase output.

In the connection structure described above, sine phase coil patterns and cosine phase coil patterns that are disposed on the same plane are arranged alternately, that is to say, the coil patterns of the same phase are not located next to each other. On the other hand, the coil patterns of the same phase disposed on respective different planes are located so as to axially overlap with each other thus matching the coil phases, and so respective magnetic fluxes generated by two overlapping coil patterns have the same direction when current is applied between one pair of lead wires. Also, it is arranged such that electric currents running respectively through two coil patterns of one phase sandwiching one coil pattern of the other phase are to flow in respective opposite spiral directions.

Moreover, two resolver stator coil patterns disposed immediately next to each other circumferentially on the same plane correspond in size (area) to one resolver rotor coil pattern shown in FIG. 6A/6B. Specifically, it is arranged such that, for example, the area of the resolver rotor coil pattern 216*a* (refer to FIG. 6A) corresponds to the aggregate area covered by the resolver stator coil patterns 236*a* and 236*b* which are disposed immediately next to each other in the circumferential direction.

Two adjacent resolver stator coil patterns are circumferentially shifted from each other by a mechanical angle of 22.5 degrees (360 degrees/16). In the case of the present embodiment, since n is 4 in the axial multiple angle nX, the mechanical angle between a sine phase coil pattern and a cosine phase coil pattern adjacent to the sine phase coil pattern is (90/(m× n)) degrees where m=1 and n=4. That is to say, the mechanical angle corresponding to one cycle in the axial multiple angle nX=4X is (360 degrees/4)=90 degrees, and a mechanical angle difference of 22.5 degrees which is obtained by further dividing equally the mechanical angle of 90 degrees into four is provided between two adjacent resolver stator patterns (sine phase detection coil pattern and cosine phase detection coil pattern) within the 90 degree angular range in order to achieve a phase difference (2π/4) of an electrical angle of 90 degrees.

Figure 10A:
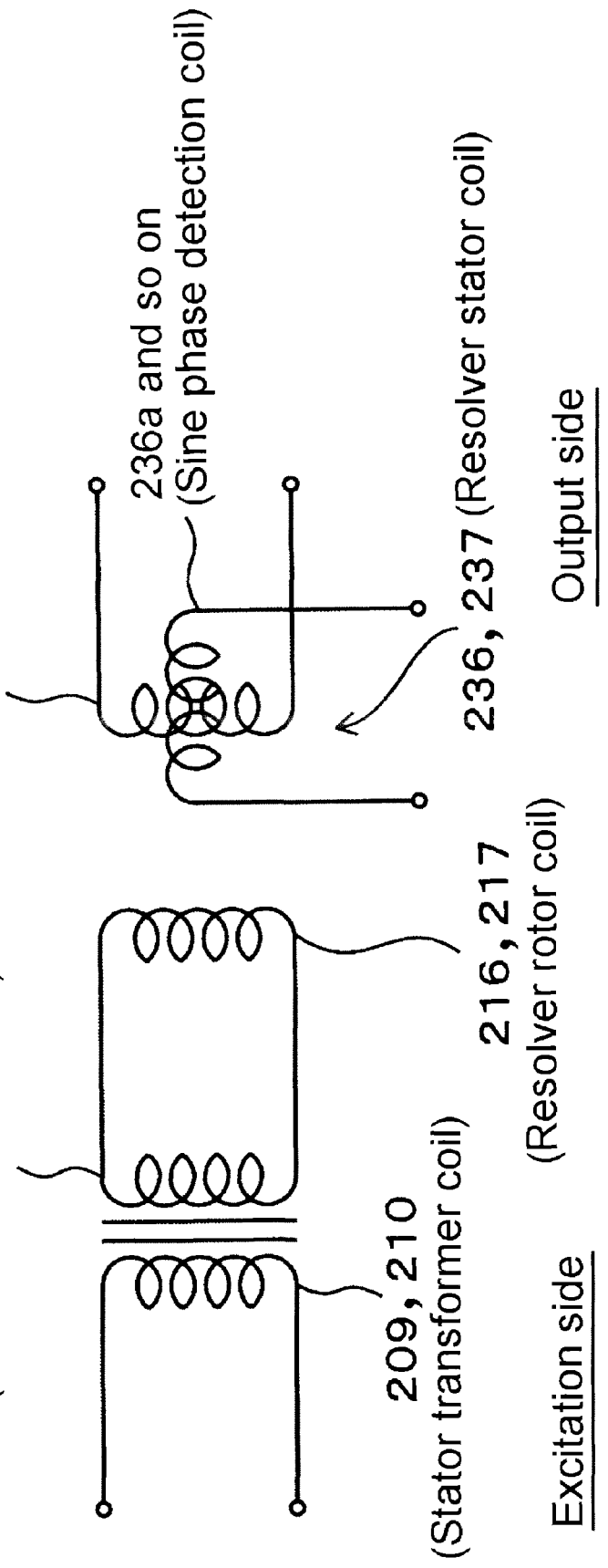
FIG. 10A is a wiring diagram of a single-phase input and two-phase output structure of the sheet coil type resolver according to the first embodiment.
Figure 10B:
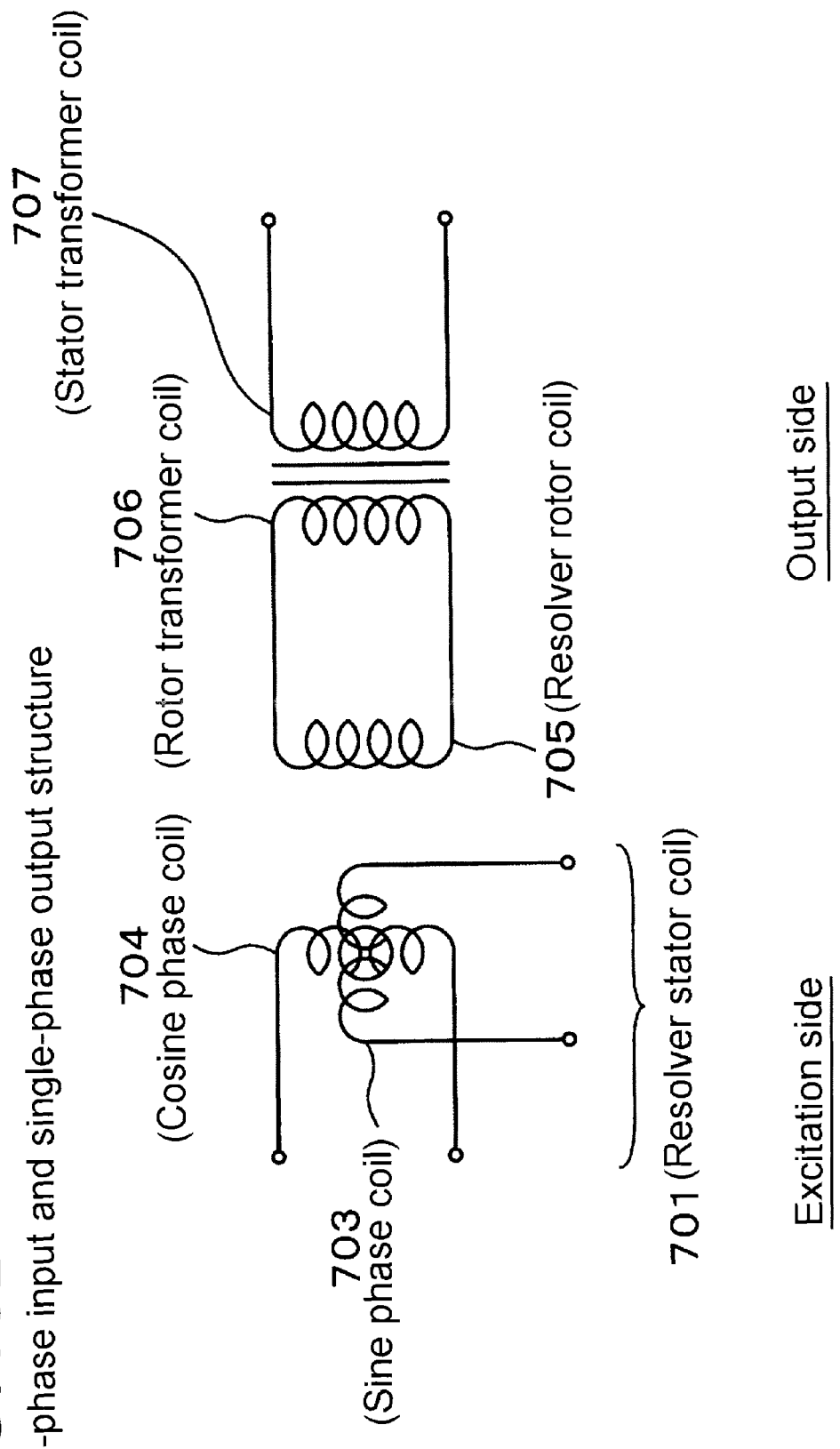
FIG. 10B is a wiring diagram of a two-phase input and single-phase output structure of a sheet coil type resolver according to a second embodiment.

FIGS. 10A and 10B schematically illustrate resolver wiring diagrams where electrical relations between coils are conceptually shown. The rotation angle detection operation of the sheet coil type resolver 200 according to the first embodiment will be described with reference to FIG. 10A which conceptually shows electrical structure of the sheet coil type resolver 200. Referring to FIG. 10A, the first and second stator transformer coil layers 209 and 210 (refer also to FIG. 2) are supplied with an alternating current for excitation. When an alternating current is applied to the first and second stator transformer coil layers 209 and 210, a current is induced at the first and second rotor transformer coil layers 205 and 206 based on the electromagnetic induction phenomenon, and the current induced is supplied to the first and second resolver rotor coil layers 216 and 217. By means of the induction current used as excitation current, the first and second resolver rotor coil layers 216 and 217 generate an alternating magnetic flux, which is detected at the first and second resolver stator coil layers 236 and 237 based on the electromagnetic induction principle.

Based on the alternating magnetic flux generated by the first and second resolver rotor coil layers 216 and 217, two induction voltages are generated respectively at two coil groups (specifically, the sine phase detection coil group and the cosine phase detection coil group) in the first and second resolver stator coil layers 236 and 237 wherein the two induction voltages are shifted in phase from each other by 90 degrees. That is to say, specifically, based on the alternating magnetic flux generated by the first and second resolver rotor coil layers 216 and 217, an induction voltage is generated at the detection coil group of sine phase, which is composed of the resolver stator coil patterns 236*a*, 237*a*, 237*c*, 236*c*, 236*e*, 237*e*, 237*g*, 236*g*, 236*i*, 237*i*, 237*k*, 236*k*, 236*m*, 237*m*, 237*o* and 236*o*, and another induction voltage, which is shifted in phase by 90 degrees from the above described induction voltage generated at the detection coil group of cosine phase, is generated at the detection coil group of cosine phase, which is composed of the resolver stator coil patterns 236*b*, 237*b*, 237*d*, 236*d*, 236*f*, 237*f*, 237*h*, 236*h*, 236*j*, 237*j*, 237*l*, 236*l*, 236*n*, 237*n*, 237*p* and 236*p*.

When the rotary shaft 101 rotates, the rotor section 201 is rotated with respect to the stator 202, and the affect of the rotation appears in the sine phase output component and the cosine output component induced at the detection coil groups of respective phases. For example, when an excitation signal of Vext=E sin ωt is applied to the first and second rotor transformer coil layers 205 and 206, an output represented by Formula 1 shown below appears at the sine phase detection coil group of the first and second resolver stator coil layers 236 and 237 according to a rotation angle θ of the rotary shaft 101 with respect to a reference position, while an output represented by Formula 2 below appears at the cosine phase detection coil group of the first and second resolver stator coil layers 236 and 237.

$$V\sin = k \cdot E\,\sin(\omega t + \alpha) \cdot \sin(n\theta) \quad \text{Formula 1}$$

$$V\cos = k \cdot E\,\sin(\omega t + \alpha) \cdot \cos(n\theta) \quad \text{Formula 2}$$

where k is a proportional constant, E is an amplitude of an excitation signal, n is an arbitrary integer of one or more, ω is an excitation frequency and α is a phase shift angle. Since Formula 1 and Formula 2 have a relationship of V sin/V cos=tan(nθ), θ can be calculated at the R/D converter (not shown) based on the value of V sin and V cos.

The sheet coil type resolver 200 described above has the advantages described below. The rotor section 201 is structured such that the first and second rotor transformer coil layers 205 and 206 are disposed so as to overlap axially with the first and second resolver rotor coil layers (excitation coils) 216 and 217. The stator section 202 is structured such that the first and second stator transformer coil layers 201 and 210 are disposed so as to overlap axially with the first and second resolver stator coil layers (detection coils) 236 and 237.

According to the structure described above, the outer diameter of both the rotor section 201 and the stator section 202 is reduced thus enabling the sheet coil type resolver 200 to be reduced in radial dimension. For example, the outer diameter conventionally measuring 50 mm can be reduced in half. On the other hand, since the transformer coil and the resolver coil are disposed to overlap axially with each other, the thickness (axial dimension) of both the rotor and stator sections 201 and 202 is increased by the aggregate thicknesses of the two transformer coils, but the aggregate thickness of the two transformer coils is several hundred μm and therefore has little impact on the entire thickness of the resolver including the core.

Also, in the structure of the sheet coil type resolver 200, since the outer diameter of both the rotor core 203 and the stator core 207 is reduced, a structural distortion hardly occurs. Further, in the structure, since the distance between the rotary shaft 101 and the outer circumference of the sheet coil type resolver 200 is reduced, the centrifugal force generated by the rotation of the rotor section 201 is reduced compared to the conventional structure. Consequently, the stress concentration between the rotary shaft 101 and the rotor core 203 is reduced, and therefore the shift in position between the rotary shaft 101 and the rotor section 201 as well as the fracture of the interface therebetween tend to occur less frequently.

Moreover, since respective sheet coils are disposed to be axially separate from one another, the terminal of each of the sheet coils can be easily led out and at the same time the inconveniences can be avoided which are conventionally caused when the terminal of the transformer coils disposed at the inner side of the stator section is led outward (specifically, for example, the space for the resolver coil disposed at the outer side must be decreased in order to secure the space for leading out the terminal of the transformer coil disposed at the inner side, or an extra layer for leading out the terminal must be provided). As a result, the freedom for wiring coil patterns is increased and the space for coils can be effectively utilized. Also, the structure can be simplified.

Additionally, since the transformer coil and the resolver coil are conventionally disposed on one same plane, their respective pattern areas interfere with each other thus reducing the freedom in the pattern area. On the other hand, in the present invention, since the coils are formed on respective different planes, the outer dimension of each coil can be designed freely, without interference from other coil pattern areas, according only to the individual pattern area determined by the pattern layout, which allows the design freedom to be increased and also enables a design for effectively achieving the coil performance.

A second embodiment of the present invention will be described with reference to FIG. 10B as well as FIG. 10A. While the sheet coil type resolver 200 according to the first embodiment described above has a wiring of a single-phase input and two-phase output structure shown in FIG. 10A, a wiring of a two-phase input and single-phase output structure shown in FIG. 10B may alternatively be used, which constitutes a sheet coil type resolver according to the second embodiment. In the case of the wiring shown in FIG. 10B, a resolver stator coil 701 includes a sine phase coil 703 and a cosine phase coil 704. Excitation currents of respective phases are applied to the sine and cosine phase coils 703 and 704, an alternating magnetic field generated by the sine and cosine phase coils 703 and 704 is detected at a resolver rotor coil 705, and a signal of the detection is transmitted from a rotor transformer coil 706 to a stator transformer coil 707 and is output to an R/D converter (not shown).

In the second embodiment also, since the resolver coil and the transformer coil are disposed along the axial direction, the advantages mentioned in the description of the first embodiment can be achieved in the same manner.

Figure 11:
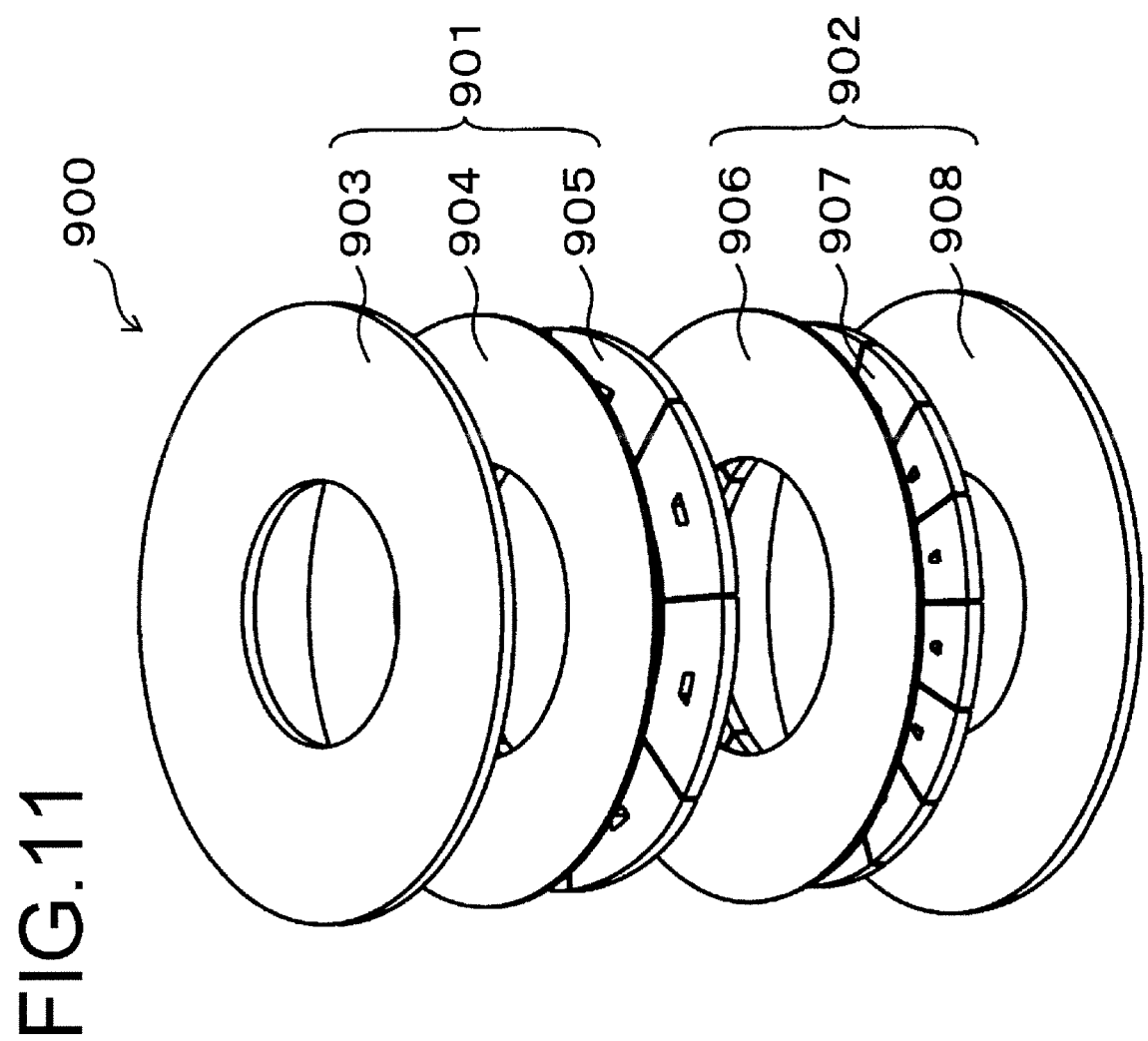
FIG. 11 is an exploded perspective view of a relevant portion of a sheet coil type resolver according to a third embodiment of the present invention.

The present invention is not limited to the first embodiment in terms of the location arrangement of the transformer coil and the resolver coil, and additional embodiments with arrangement variations are possible. FIG. 11 perspectively shows a relevant portion of a sheet type coil type resolver 900 according to a third embodiment of the present invention in an exploded manner. Referring to FIG. 11, the sheet coil type resolver 900 includes a rotor section 901 and a stator section 902.

In the sheet coil type resolver 900, the rotor section 901 is structured such that a rotor core 903, a rotor transformer coil 904 and a resolver rotor coil 905 are arranged axially in this order toward the stator section 902, which is basically the same as in the sheet coil type 200 according to the first embodiment.

On the other hand, the sheet coil type resolver 900 shown in FIG. 11 is different in the stator section structure (902) from the sheet coil type resolver 200 according to the first embodiment, specifically the stator section 902 of the sheet coil type resolver 900 is structured such that a stator transformer coil 906, a resolver stator coil 907 and a stator core 908 are arranged axially in this order from the rotor section 901, thus reversing the disposition order of the stator transformer coil and the resolver stator coil compared with the sheet coil type resolver 200 according to the first embodiment.

The advantages referred to in the description of the first embodiment can be achieved by the third embodiment in the same manner, which applies to further embodiments described hereinafter.

Figure 12:
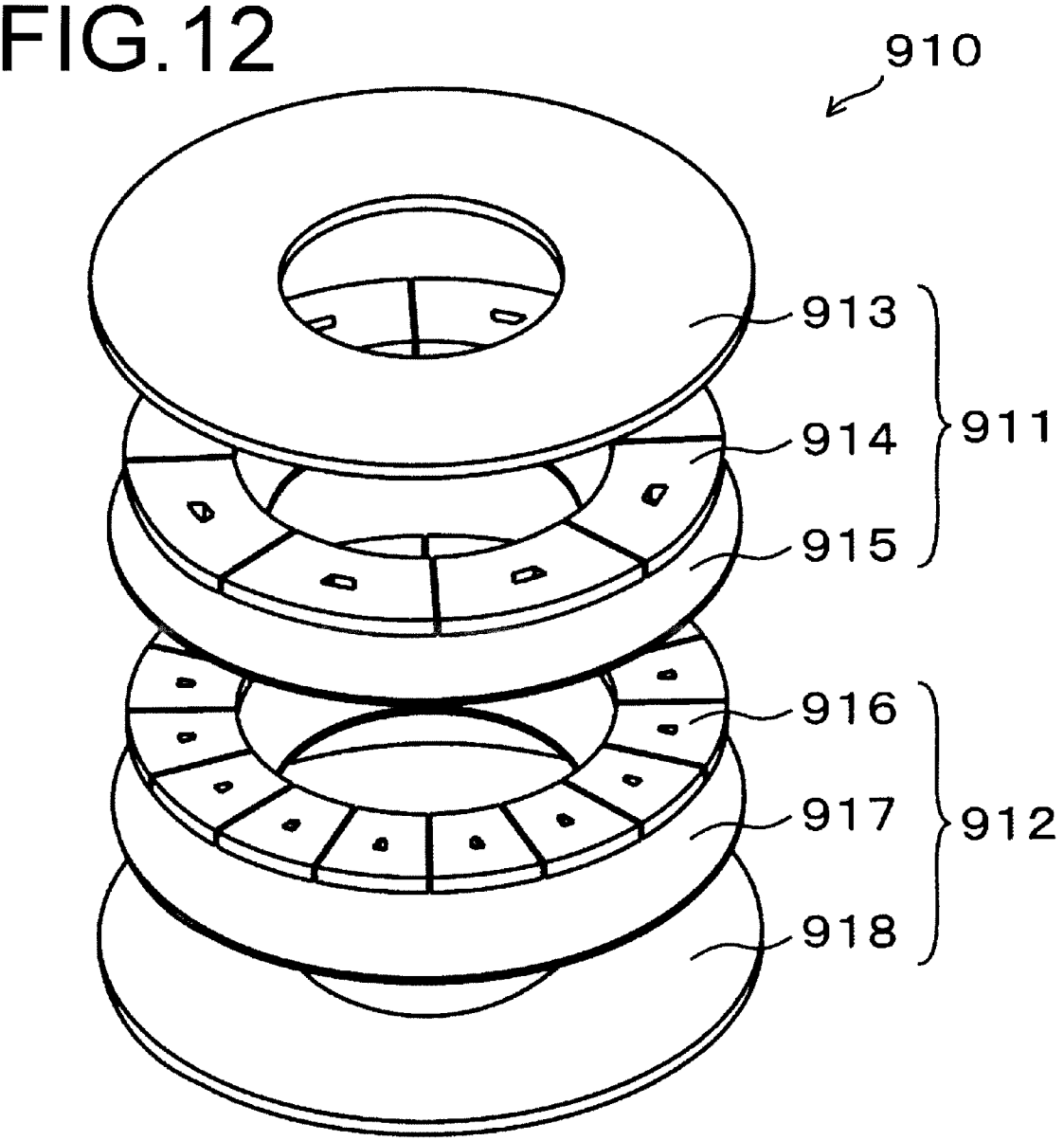
FIG. 12 is an exploded perspective view of a relevant portion of a sheet coil type resolver according to a fourth embodiment of the present invention.

A fourth embodiment of the present invention will be described with reference to FIG. 12. Referring to FIG. 12, a sheet coil type resolver 910 according to the fourth embodiment includes a rotor section 911 and a stator section 912. The rotor section 911 of the sheet coil type resolver 910 is structured such that a rotor core 913, a resolver rotor coil 914 and a rotor transformer coil 915 are arranged axially in this order toward the stator section 912, thus reversing the disposition order of the resolver rotor coil and the rotor transformer coil compared with the sheet coil type resolver 200 according to the first embodiment.

On the other hand, the stator section 912 is structured such that a resolver stator coil 916, a stator transformer coil 917 and a stator core 918 are arranged axially in this order from the rotor section 911 in the same manner as in the sheet coil type resolver 200 according to the first embodiment.

Figure 13:
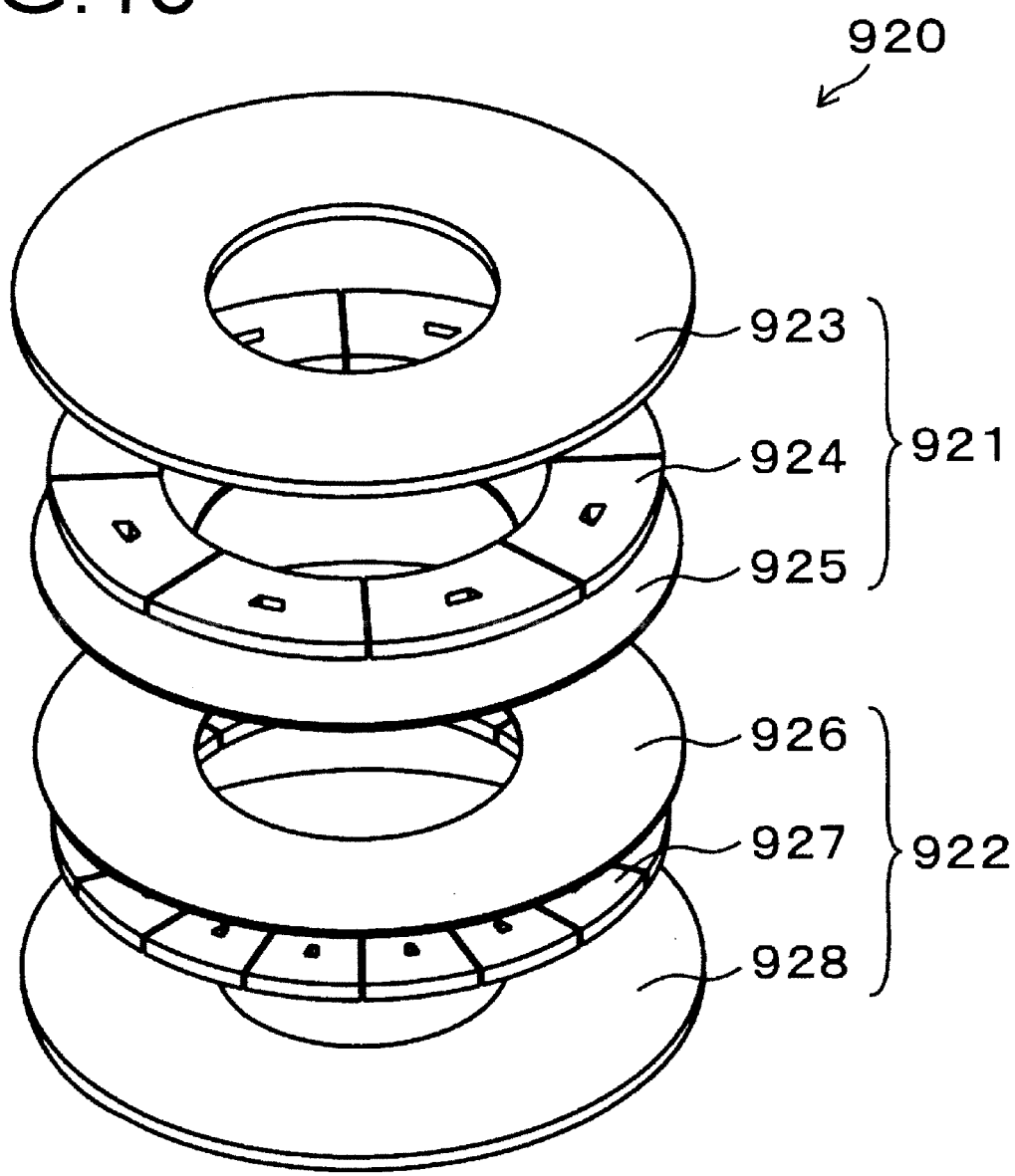
FIG. 13 is an exploded perspective view of a relevant portion of a sheet coil type resolver according to a fifth embodiment of the present invention.
Figure 14:
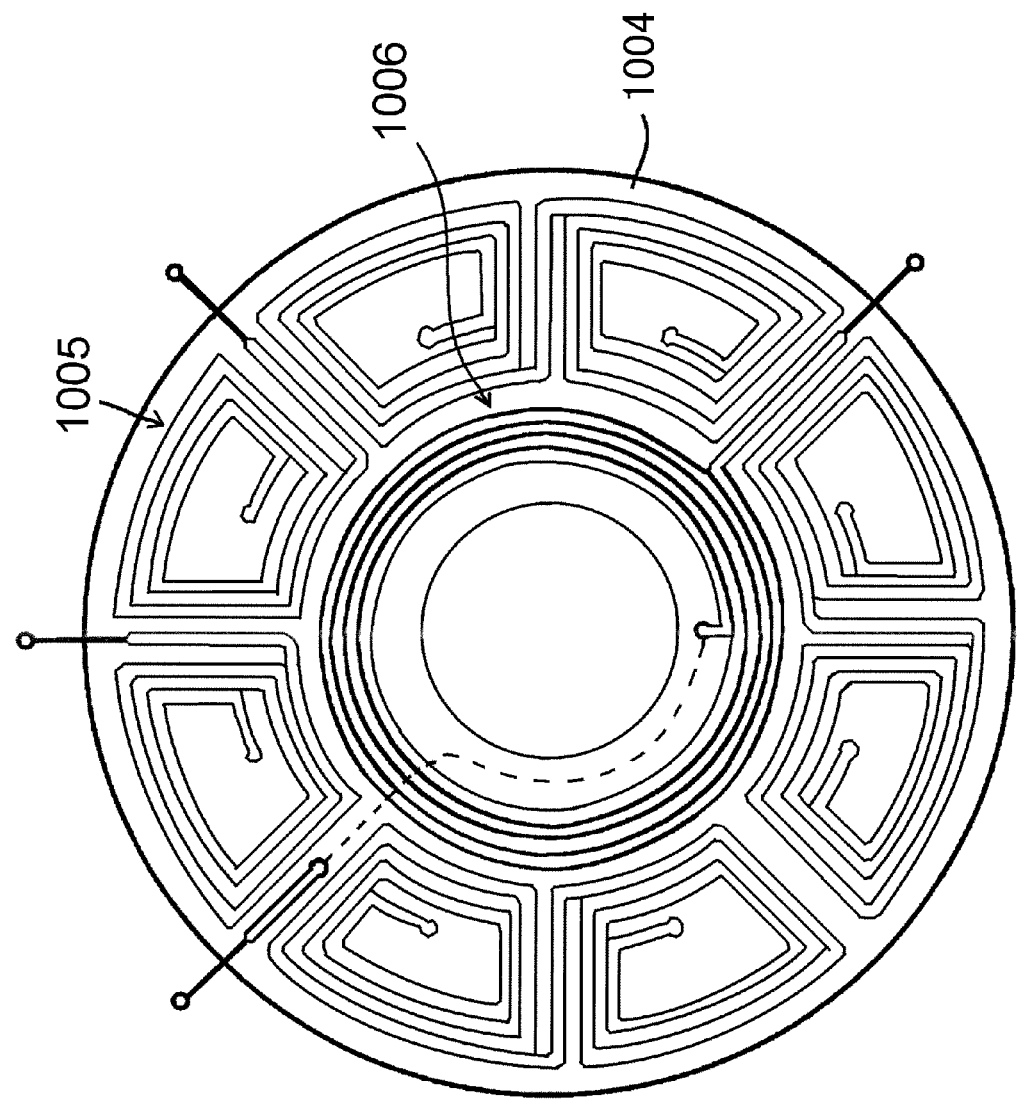
FIG. 14 is a radial cross sectional view of a rotor coil system of a conventional sheet coil type resolver.

A fifth embodiment of the present invention will be described with reference to FIG. 13. Referring to FIG. 13, a sheet coil type resolver 920 according to the fifth embodiment includes a rotor section 921 and a stator section 922. The rotor section 912 of the sheet coil type resolver 920 is structured such that a rotor core 923, a resolver rotor coil 924 and a rotor transformer coil 925 are arranged axially in this order toward the stator section 922, thus reversing the disposition order of the resolver rotor coil and the rotor transformer coil compared with the sheet coil type resolver 200 according to the first embodiment.

The stator section 922 is structured such that a stator transformer coil 926, a resolver stator coil 927 and a stator core 928 are arranged axially in this order from the rotor section 921, thus reversing the stator transformer coil and the resolver stator coil compared with the sheet coil type resolver 200 according to the first embodiment.

Moreover, the present invention is not limited to the embodiments described above in terms of the coil pattern structure of the sine and cosine phases of the resolver coil at the stator section. The coil pattern of the sine phase and the coil pattern of the cosine phase may alternatively be disposed in respective different layers as in, for example, the conventional sheet coil type resolver disclosed in Japanese Patent Application Laid-Open No. H8-136211. Also, in the present invention, the axial multiple angle is not limited to 4x, the coil pattern shape of the coils is not limited to what is described in the embodiments, and the coils each do not necessarily have to have a two-layer structure and may be structured in one layer or three or more layers wherein each of the layer structures of the coils can be freely designed.

What is claimed is:

1. A sheet coil type resolver comprising:
a stator section comprising a resolver stator coil and a stator transformer coil each thereof comprising at least one coil layer, the at least one coil layer of the resolver stator coil comprising one or more stator coil patterns which have a planar shape and which are disposed circumferentially on a same plane, wherein the resolver stator coil and the stator transformer coil are disposed to axially overlap with each other; and
a rotor section comprising a resolver rotor coil and a rotor transformer coil each thereof comprising at least one coil layer, the at least one coil layer of the resolver rotor coil comprising one or more rotor coil patterns which have a planar shape and which are disposed circumferentially on a same plane, wherein the resolver rotor coil and the rotor transformer coil are disposed to axially overlap with each other, and wherein the rotor section is disposed to axially oppose the stator section with an air gap therebetween.

2. A sheet coil type resolver according to claim 1, wherein outside dimensions of the resolver stator coil, the stator transformer coil, the resolver rotor coil and the rotor transformer coil are individually determined according to pattern areas configured by respective coil pattern layouts.

3. A sheet coil type resolver according to claim 1, wherein the stator section further comprises a stator core disposed at one axial end of the sheet coil type resolver and is structured such that the stator core, the stator transformer coil and the resolver stator coil are arranged axially in this order of the stator core, the stator transformer coil and the resolver stator coil toward the rotor section, and wherein
the rotor section further comprises a rotor core disposed at another axial end of the sheet coil type resolver and is structured such that the rotor core, the rotor transformer coil and the resolver rotor coil are arranged axially in order of the rotor core, the rotor transformer coil and the resolver rotor coil toward the stator section.

4. A sheet coil type resolver according to claim 1, wherein the stator section further comprises a stator core disposed at one axial end of the sheet coil type resolver and is structured such that the stator core, the resolver stator coil and the stator transformer coil are arranged axially in order of the stator core, the resolver stator coil and the stator transformer coil toward the rotor section, and wherein
the rotor section further comprises a rotor core disposed at another axial end of the sheet coil type resolver and is structured such that the rotor core, the rotor transformer coil and the resolver rotor coil are arranged axially in order of the rotor core, the rotor transformer coil and the resolver rotor coil toward the stator section.

5. A sheet coil type resolver according to claim 1, wherein the stator section further comprises a stator core disposed at one axial end of the sheet coil type resolver and is structured such that the stator core, the stator transformer coil and the resolver stator coil are arranged axially in order of the stator core, the stator transformer coil, and the resolver stator coil toward the rotor section, and wherein
the rotor section further comprises a rotor core disposed at another axial end of the sheet coil type resolver and is structured such that the rotor core, the resolver rotor coil and the rotor transformer coil are arranged axially in order of the rotor core, the resolver rotor coil and the rotor transformer coil toward the stator section.

6. A sheet coil type resolver according to claim 1, wherein the stator section further comprises a stator core disposed at one axial end of the sheet coil type resolver and is structured such that the stator core, the resolver stator coil and the stator transformer coil are arranged axially in order of the stator core, the resolver stator coil, and the stator transformer coil toward the rotor section, and wherein
the rotor section further comprises a rotor core disposed at another axial end of the sheet coil type resolver and is structured such that the rotor core, the resolver rotor coil and the rotor transformer coil are arranged axially in order of the rotor core, the resolver rotor coil and the rotor transformer coil toward the stator section.

* * * * *

UNITED STATES PATENT AND TRADEMARK OFFICE
CERTIFICATE OF CORRECTION

PATENT NO. : 8,415,945 B2  
APPLICATION NO. : 12/850839  
DATED : April 9, 2013  
INVENTOR(S) : Kazuhiko Fujita et al.

Page 1 of 1

It is certified that error appears in the above-identified patent and that said Letters Patent is hereby corrected as shown below:

ON THE TITLE PAGE

The 2nd inventor's name should read as:   Taka<u>ko</u> FUKUDA

Signed and Sealed this  
Sixteenth Day of July, 2013

Teresa Stanek Rea  
*Acting Director of the United States Patent and Trademark Office*